US009325954B2

(12) United States Patent
Aoki et al.

(10) Patent No.: US 9,325,954 B2
(45) Date of Patent: Apr. 26, 2016

(54) COLOR IMAGING ELEMENT HAVING PHASE DIFFERENCE DETECTION PIXELS AND IMAGING APPARATUS EQUIPPED WITH THE SAME

(71) Applicant: FUJIFILM Corporation, Tokyo (JP)

(72) Inventors: Takashi Aoki, Saitama (JP); Kazuki Inoue, Saitama (JP); Seiji Tanaka, Saitama (JP); Hiroshi Endo, Saitama (JP); Kenkichi Hayashi, Saitama (JP); Yoichi Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/319,887

(22) Filed: Jun. 30, 2014

(65) Prior Publication Data

US 2014/0313380 A1 Oct. 23, 2014

Related U.S. Application Data

(63) Continuation of application No. PCT/JP2012/082384, filed on Dec. 13, 2012.

(30) Foreign Application Priority Data

Dec. 28, 2011 (JP) ................................ 2011-288032

(51) Int. Cl.

| | |
|---|---|
| ***H04N 9/04*** | (2006.01) |
| ***H04N 5/335*** | (2011.01) |
| ***H04N 5/232*** | (2006.01) |
| ***H04N 5/369*** | (2011.01) |
| *G02B 5/20* | (2006.01) |
| *H04N 5/225* | (2006.01) |

(52) U.S. Cl.

CPC .......... *H04N 9/045* (2013.01); *H04N 5/23212* (2013.01); *H04N 5/335* (2013.01); *H04N 5/3696* (2013.01); *G02B 5/201* (2013.01); *H04N 5/2254* (2013.01)

(58) Field of Classification Search

None

See application file for complete search history.

(56) References Cited

U.S. PATENT DOCUMENTS

| | | | |
|---|---|---|---|
| 5,251,019 | A | 10/1993 | Moorman et al. |
| 5,889,554 | A | 3/1999 | Mutze |

(Continued)

FOREIGN PATENT DOCUMENTS

| | | | |
|---|---|---|---|
| EP | 1793620 | A1 | 6/2007 |
| JP | H02210996 | A | 8/1990 |

(Continued)

OTHER PUBLICATIONS

International Search Report, issued in PCT/JP2012/082384, dated Jan. 29, 2013.

(Continued)

*Primary Examiner* — Justin P Misleh

(74) *Attorney, Agent, or Firm* — Birch, Stewart, Kolasch & Birch, LLP

(57) ABSTRACT

A color imaging element, includes a color filter array, in which the color filter array includes an array pattern of a 3×3 pixel group in which first filters corresponding to a green color and second filters corresponding to red and blue colors are arrayed, and the first filters are placed at a center and 4 corners in the 3×3 pixel group, and the array pattern is repeatedly placed in horizontal and vertical directions, and in a pixel group within a predetermined area of the color imaging element, phase difference detection pixels for acquiring phase difference information are placed in entire components of one direction among components in the horizontal direction and components in the vertical direction in the pixel group.

7 Claims, 24 Drawing Sheets

(56) References Cited

U.S. PATENT DOCUMENTS

| | | | | |
|---|---|---|---|---|
| 6,829,008 | B1 * | 12/2004 | Kondo et al. | 348/302 |
| 2008/0131028 | A1 | 6/2008 | Pillman et al. | |
| 2009/0200451 | A1 | 8/2009 | Conners | |
| 2011/0249156 | A1 * | 10/2011 | Goto | 348/272 |
| 2012/0176520 | A1 * | 7/2012 | Hara | H04N 5/367 348/246 |

FOREIGN PATENT DOCUMENTS

| | | | |
|---|---|---|---|
| JP | 5-505718 | A | 8/1993 |
| JP | 2010-512048 | A | 4/2010 |
| JP | 2011-242514 | A | 12/2011 |
| JP | 2011-252955 | A | 12/2011 |

OTHER PUBLICATIONS

Written Opinion of the International Searching Authority, issued in PCT/JP2012/082384, dated Jan. 29, 2013.

Extended European Search Report, dated Aug. 4, 2014, in related application No. EP11859479.5.

Extended European Search Report, dated Jan. 27, 2015, in related application No. EP12804973.1.

Extended European Search Report, dated Oct. 28, 2014, in related application No. EP11859950.5.

Hirakawa, "Spatio-Spectral Color Filter Array Design for Optimal Image Recovery", IEEE Transactions on Image Processing 17:10:1876-1890 (Oct. 2008).

* cited by examiner

*FIG. 9*

| | | | | | | | | | | | |
|---|---|---|---|---|---|---|---|---|---|---|---|
| X | | | | | | Y | | | | | |
| | X | | | | | | Y | | | | |
| | | X | | | | | | Y | | | |
| | | | X | | | | | | Y | | |
| | | | | X | | | | | | Y | |
| | | | | | X | | | | | | Y |
| Y | | | | | | X | | | | | |
| | Y | | | | | | X | | | | |
| | | Y | | | | | | X | | | |
| | | | Y | | | | | | X | | |
| | | | | Y | | | | | | X | |
| | | | | | Y | | | | | | X |

FIG. 10

| | | | | | | | | | | | |
|---|---|---|---|---|---|---|---|---|---|---|---|
| X | | | | | | Y | | | | | |
| | Y | | | | | | X | | | | |
| | | X | | | | | | Y | | | |
| | | | Y | | | | | | X | | |
| | | | | X | | | | | | Y | |
| | | | | | Y | | | | | | X |
| Y | | | | | | X | | | | | |
| | X | | | | | | Y | | | | |
| | | Y | | | | | | X | | | |
| | | | X | | | | | | Y | | |
| | | | | Y | | | | | | X | |
| | | | | | X | | | | | | Y |

FIG. 11A

| | | | | | | | | | | | |
|---|---|---|---|---|---|---|---|---|---|---|---|
| | R | | | B | | | R | | | B | |
| B | | B | R | | R | B | | B | R | | R |
| | R | | | B | | | R | | | B | |
| | B | | | R | | | B | | | R | |
| R | | R | B | | B | R | | R | B | | B |
| | B | | | R | | | B | | | R | |
| | R | | | B | | | R | | | B | |
| B | | B | R | | R | B | | B | R | | R |
| | R | | | B | | | R | | | B | |
| | B | | | R | | | B | | | R | |
| R | | R | B | | B | R | | R | B | | B |
| | B | | | R | | | B | | | R | |

FIG. 11B

| | | |
|---|---|---|
| G | R | G |
| B | G | B |
| G | R | G |

FIG. 11C

| | | |
|---|---|---|
| G | B | G |
| R | G | R |
| G | B | G |

FIG. 12A

| | | | | | | | | | | | |
|---|---|---|---|---|---|---|---|---|---|---|---|
| | B | | | R | | | B | | | R | |
| B | | R | R | | B | B | | R | R | | B |
| | R | | | B | | | R | | | B | |
| | R | | | B | | | R | | | B | |
| R | | B | B | | R | R | | B | B | | R |
| | B | | | R | | | B | | | R | |
| | B | | | R | | | B | | | R | |
| B | | R | R | | B | B | | R | R | | B |
| | R | | | B | | | R | | | B | |
| | R | | | B | | | R | | | B | |
| R | | B | B | | R | R | | B | B | | R |
| | B | | | R | | | B | | | R | |

FIG. 12B

| | | |
|---|---|---|
| G | R | G |
| R | G | B |
| G | B | G |

FIG. 12C

| | | |
|---|---|---|
| G | B | G |
| B | G | R |
| G | R | G |

FIG. 14

| | | | | | | | | | | | | |
|---|---|---|---|---|---|---|---|---|---|---|---|---|
| 1 | | R | | | B | | | R | | | B | |
| 2 | B | | B | R | | R | B | | B | R | | R |
| 3 | X | X | X | X | X | X | X | X | X | X | X | X |
| 4 | | B | | | R | | | B | | | R | |
| 5 | R | | R | B | | B | R | | R | B | | B |
| 6 | | B | | | R | | | B | | | R | |
| 7 | | R | | | B | | | R | | | B | |
| 8 | B | | B | R | | R | B | | B | R | | R |
| 9 | Y | Y | Y | Y | Y | Y | Y | Y | Y | Y | Y | Y |
| 10 | | B | | | R | | | B | | | R | |
| 11 | R | | R | B | | B | R | | R | B | | B |
| 12 | | B | | | R | | | B | | | R | |

FIG. 20

| | | | | | | | | | | | |
|---|---|---|---|---|---|---|---|---|---|---|---|
| X | R | | | B | | X | R | | | B | |
| B | | B | R | | R | B | | B | R | | R |
| | R | | | B | | | R | | | B | |
| | B | | X | R | | | B | | X | R | |
| R | X | R | B | | B | R | X | R | B | | B |
| | B | | | R | | | B | | | R | |
| | R | X | | B | | | R | X | | B | |
| B | | B | R | X | R | B | | B | R | X | R |
| | R | | | B | | | R | | | B | |
| | B | | | R | X | | B | | | R | X |
| R | | R | B | | B | R | | R | B | | B |
| | B | | | R | | | B | | | R | |
| Y | R | | | B | | Y | R | | | B | |
| B | | B | R | | R | B | | B | R | | R |
| | R | | | B | | | R | | | B | |
| | B | | Y | R | | | B | | Y | R | |
| R | Y | R | B | | B | R | Y | R | B | | B |
| | B | | | R | | | B | | | R | |
| | R | Y | | B | | | R | Y | | B | |
| B | | B | R | Y | R | B | | B | R | Y | R |
| | R | | | B | | | R | | | B | |
| | B | | | R | Y | | B | | | R | Y |
| R | | R | B | | B | R | | R | B | | B |
| | B | | | R | | | B | | | R | |

*FIG. 21*

| | 1 | 2 | 3 | 4 | 5 | 6 | 7 | 8 | 9 | 10 | 11 | 12 |
|---|---|---|---|---|---|---|---|---|---|---|---|---|
| 1 | | R | | | B | | | R | | | B | |
| 2 | B | | B | R | | R | B | | B | R | | R |
| 3 | X | R | | X | B | | X | R | | X | B | |
| 4 | | B | | | R | | | B | | | R | |
| 5 | R | | R | B | | B | R | | R | B | | B |
| 6 | | B | | | R | | | B | | | R | |
| 7 | Y | R | | Y | B | | Y | R | | Y | B | |
| 8 | B | | B | R | | R | B | | B | R | | R |
| 9 | | R | X | | B | X | | R | X | | B | X |
| 10 | | B | | | R | | | B | | | R | |
| 11 | R | | R | B | | B | R | | R | B | | B |
| 12 | | B | Y | | R | Y | | B | Y | | R | Y |

COLOR IMAGING ELEMENT HAVING PHASE DIFFERENCE DETECTION PIXELS AND IMAGING APPARATUS EQUIPPED WITH THE SAME

CROSS REFERENCE TO RELATED APPLICATION

This is a continuation of International Application No. PCT/JP2012/082384 filed on Dec. 13, 2012, and claims priority from Japanese Patent Application No. 2011-288032, filed on Dec. 28, 2011, the entire disclosures of which are incorporated herein by reference.

BACKGROUND

1. Technical Field

The present invention relates to a color imaging element having a phase difference detection pixel and an imaging apparatus equipped with the color imaging element.

2. Related Art

An imaging element such as a CCD type or a CMOS type is configured by arraying pixels, which are photoelectric conversion elements, in a 2D array pattern. FIG. 22A illustrates a plan view of 1 pixel and a light blocking layer 1*a* is stacked on a rectangular photoelectric conversion element (photodiode, hereinafter, referred to as a pixel) 1 and an opening 1*b* is provided in the light blocking layer 1*a*. The opening 1*b* is formed widely such that a light receiving surface of the pixel 1 may not be covered if possible so as to receive a large amount of light.

The plurality of such pixels 1 is arrayed on a surface of a semiconductor board in the 2D array pattern. However, an imaging element in which a phase difference detection pixel coexists in an array of pixels 1 that captures a subject image has been recently proposed and applied to an actual device.

FIG. 22B is a plan view of one example of a phase difference detection pixel. In a phase difference detection pixel 2, a light blocking layer opening 2*b* which is narrower than the opening 1*b* of FIG. 22A is provided to be eccentric to the right with respect to a center of the pixel. In a phase difference detection pixel 3, a narrow light blocking layer opening 3*b* having the same size as the light blocking layer opening 2*b* is provided to be eccentric to the left with respect to the center of the pixel.

A pair of the phase difference detection pixels 2 and 3 in which the light blocking layer openings 2*b* and 3*b* are displaced horizontally are used to acquire left-right-direction, that is, horizontal incident light phase difference information. In addition, when the phase difference detection pixel pair is arranged horizontally in an imaging element, a horizontal distribution of the phase difference information may be acquired and for example, a focus distance up to a subject may be detected from the distribution information. As a result, the phase difference detection pixels 2 and 3 are used as focus detecting pixels in Patent Literature 1 (JP-A-2011-252955) and Patent Literature 2 (JP-A-2011-242514).

FIG. 23 is a view describing a layout of the phase difference detection pixels disclosed in Patent Literatures 1 and 2. Light blocking layer openings of pixels (will be referred to as ordinary pixels) other than the phase difference detection pixels are not illustrated. In an imaging element 5 in the related art, ordinary pixels 1 are arrayed in a square lattice shape and all pixels for 1 row within a predetermined range among the ordinary pixels 1 become a pair of the phase difference detection pixels 2 and 3. FIG. 23 is a view describing a layout of the phase difference detection pixels disclosed in Patent Literatures 1 and 2. Light blocking layer openings of pixels (referred to as ordinary pixels) other than the phase difference detection pixels are not illustrated. In an imaging element 5 in the related art, ordinary pixels 1 are arrayed in a square lattice shape and all pixels for 1 row within a predetermined range among the ordinary pixels 1 become pairs of the phase difference detection pixels 2 and 3.

When all the pixels for 1 row become the phase difference detection pixel pairs as described above, it is advantageous in that a horizontal resolution of the detected phase difference information is increased. Although a description has been made above on an example in which the phase difference pixel pair is configured by making the narrow light blocking layer openings 2*b* and 3*b* be eccentric to the center of the pixel, one ellipsoidal microlens may be mounted with respect to 2 pixels adjacent to the ordinary pixels 1 to be pupil-divided, which become the phase difference pixel pair.

SUMMARY OF INVENTION

That is, the phase difference detection pixel is handled in the same manner as a defective pixel in regard to imaging a subject. Like the related art illustrated in FIG. 23, all pixels for 1 row become the phase difference detection pixels to acquire distribution data of phase difference information having a high resolution in a horizontal direction. However, on the other hand, a problem also occurs. Since a phase difference detection pixel is configured to receive a smaller amount of light than the ordinary pixel 1 and further, to have a phase difference, a subject-captured captured image signal at a pixel position of the phase difference detection pixel is generally acquired by interpolation-operating the captured image signal of the neighboring ordinary pixel. That is, the phase difference detection pixel is handled in the same manner as a defective pixel in regard to imaging a subject.

In the imaging element 5 illustrated in FIG. 23, the phase difference detection pixels 2 and 3 are arrayed in one pixel row filled with the phase difference detection pixels 2 and 3 without a gap in a horizontal direction. For that reason, a captured image signal in the pixel position of the phase difference detection pixels 2 and 3 is interpolation-operated using the image signals of the ordinary pixels above and below the pixel row. That is, because all the signals of the one row are generated by the interpolation operation, the image quality of the one row deteriorates.

With respect to the constitution of FIG. 23, as illustrated in FIG. 24, when the phase difference detection pixels 2 and 3 are arranged in a vertical direction and the phase difference detection pixel pairs are arranged in a horizontal direction, horizontal resolution may be doubled as compared to that of FIG. 23. However, in this constitution, two lines among horizontal lines are filled with the phase difference detection pixels. As a result, when a captured image signal at a phase difference detection pixel position is acquired through an interpolation operation, the image quality of two lines deteriorates.

In particular, in an imaging element that captures a color image, by considering a relationship between resolution of phase difference information and an image quality when acquiring a captured image signal at the phase difference detection pixel position through a pixel interpolation operation as well as a relationship with a color filter array, and it needs to be thought which position is preferable for placing the phase difference detection pixel.

An illustrative aspect of the present invention is to provide a color imaging element and a color imaging apparatus that implement a combination of a color filter array and a placement position of a phase difference detection pixel which is capable of detecting phase difference information having high resolution and further, pixel-interpolating a captured image signal at a phase difference detection pixel position with a high definition by a captured image signal of a neighboring pixel.

According to an aspect of the present invention, it is a color imaging element in which color filters of a predetermined color filter array are placed on a plurality of pixels constituted by photoelectric conversion elements arrayed in horizontal and vertical directions, wherein the color filter array includes an array pattern of a 3×3 pixel group in which first filters corresponding to a first color that contributes most to acquiring a luminance signal and second filters corresponding to two or more second colors other than the first color are arrayed, and the first filters are placed at a center and 4 corners in the 3×3 pixel group, and the array pattern is repeatedly placed in the horizontal and vertical directions, the first filter is placed in a line of each of horizontal, vertical and oblique directions of the color filter array, a proportion of a number of pixels of the first color corresponding to the first filters is larger than a proportion of a number of pixels of each color of the second colors corresponding to the second filters, and in a pixel group within a predetermined area of the color imaging element, phase difference detection pixels for acquiring phase difference information are placed in entire components of one direction among components in the horizontal direction and components in the vertical direction in the pixel group.

According to another aspect of the present invention, it is an imaging apparatus equipped with the color imaging element.

With any configuration discussed above, it is possible to detect phase difference information having high resolution and further, to pixel-interpolate a captured image signal at a phase difference detection pixel position with a high definition by a captured image signal of a neighboring pixel.

BRIEF DESCRIPTION OF DRAWINGS

FIG. 9 is a view illustrating an array example of phase difference detection pixel pairs in an imaging element according to yet another exemplary embodiment of the present invention.

FIG. 10 is a view illustrating an array example of phase difference detection pixel pairs in an imaging element according to yet another exemplary embodiment of the present invention.

FIGS. 11A to 11C are views illustrating a color filter array of a color imaging element according to an exemplary embodiment of the present invention.

FIGS. 12A to 12C are views illustrating a color filter array of a color imaging element according to another exemplary embodiment of the present invention.

FIG. 14 is a view illustrating a modified example of the exemplary embodiment illustrated in FIG. 13.

FIG. 20 is a view illustrating an exemplary embodiment in which an array example of phase difference detection pixel pairs different therefrom is applied to the color filter array illustrated in FIGS. 11A to 11C.

FIG. 21 is a view illustrating an exemplary embodiment in which an array example of phase difference detection pixel pairs different therefrom is applied to the color filter array illustrated in FIGS. 11A to 11C.

DESCRIPTION OF EMBODIMENTS

Hereinafter, exemplary embodiments of the present invention will be described with reference to the accompanying drawings.

Figure 1:
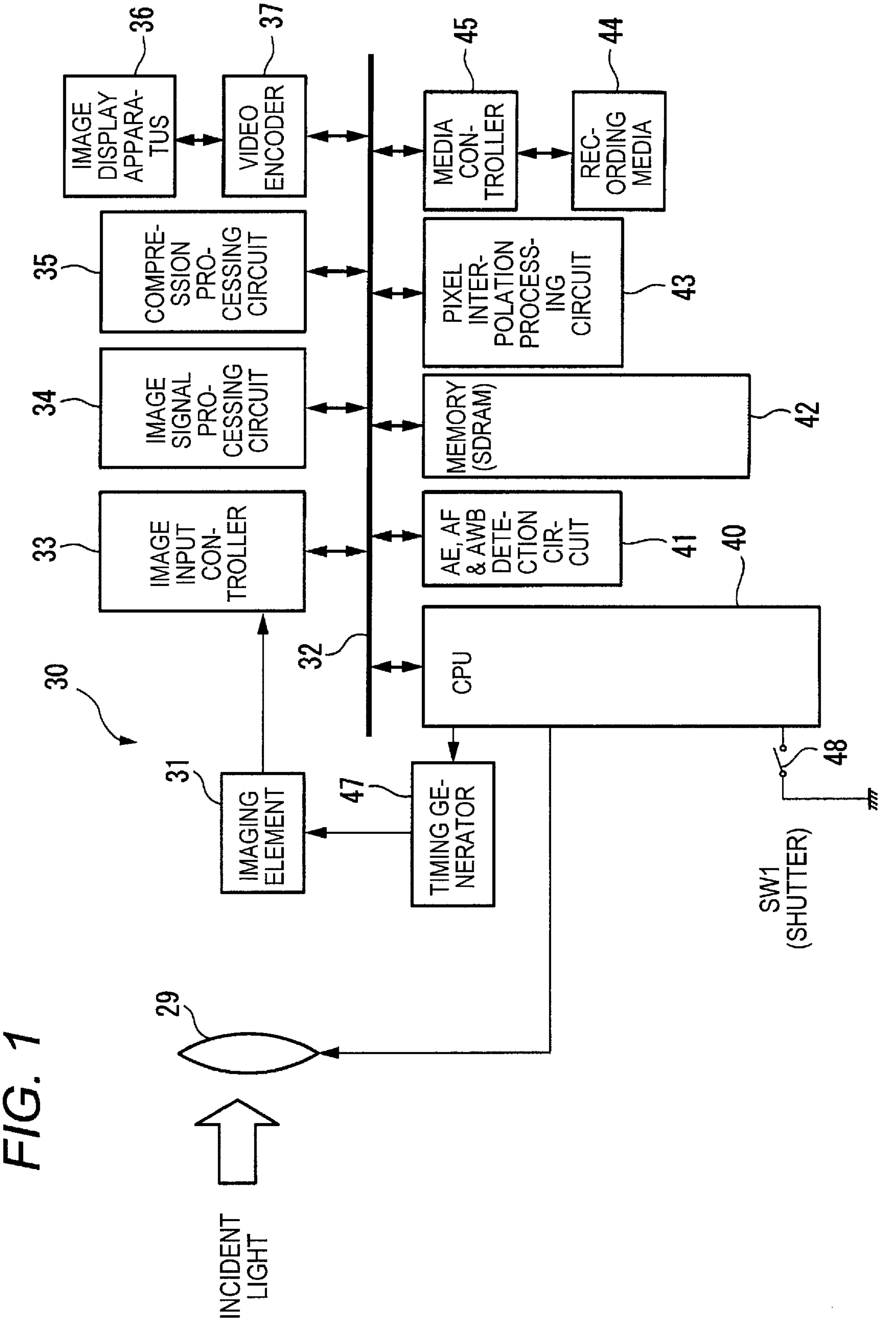
FIG. 1 is a functional block diagram of a digital camera according to an exemplary embodiment of the present invention.
Figure 22A:
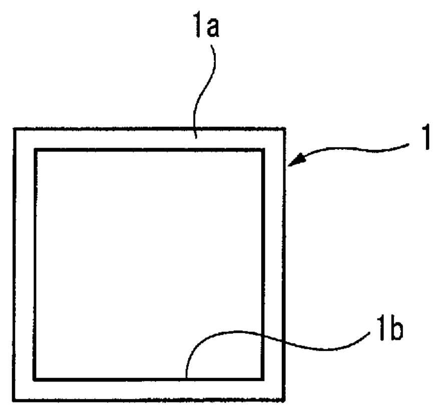
FIGS. 22A and 22B are explanatory views of an ordinary pixel and a phase difference detection pixel.

FIG. 1 is a functional block diagram of an imaging apparatus according to an exemplary embodiment of the present invention. For example, a CMOS-type imaging element 31 is placed in an imaging apparatus 30. The imaging element 31 is an element in which ordinary pixels and phase difference detection pixels illustrated in FIGS. 22A and 22B coexist. A photographing lens 29 is placed at the front end of the imaging element 31. Further, the imaging apparatus 30 is provided with an image input controller 33 that receives an output image signal of the imaging element 31 and outputs the received image signal to a bus 32. In addition, the imaging element 31 may be an imaging element of another type such as a CCD type.

An image signal processing circuit 34 that performs known image processing of the output image signal of the imaging element 31, a compression processing circuit 35 that compresses the image signal after the image processing into JPEG image data, or the like, a video encoder 37 that displays a captured image or a through image (live view image) on an image display apparatus 36 installed on a rear surface of the imaging apparatus 30, or the like, a CPU 40 that integrally controls the imaging apparatus 30, a circuit 41 that detects an automatic exposure (AE), an automatic focus (AF), and an automatic white balance (AWB) by processing a signal output from the imaging element 31 as the through image, a main memory 42, a processing circuit 43 that acquires a captured image signal at a phase difference detection pixel position through pixel interpolation, and a media controller 45 that stores JPEG image data in a recording media 44 are connected to the bus 32. The function of the processing circuit 43 is a part of functions of the image signal processing circuit 34.

The imaging element 31 is driven by a timing signal from a timing generator 47 and the timing generator 47 is operated by an instruction from the CPU 40. A focus lens position of the photographing lens 29 is also driven by the instruction from the CPU 40. A shutter release button 48 is connected to the CPU 40.

Before describing a relationship between a layout of the phase difference detection pixels and the color filter array in the imaging element 31, layout positions of the phase difference detection pixels will be described using FIGS. 2 to 10. The relationship with the color filter array will be described after FIGS. 11A to 11C.

Figure 22B:
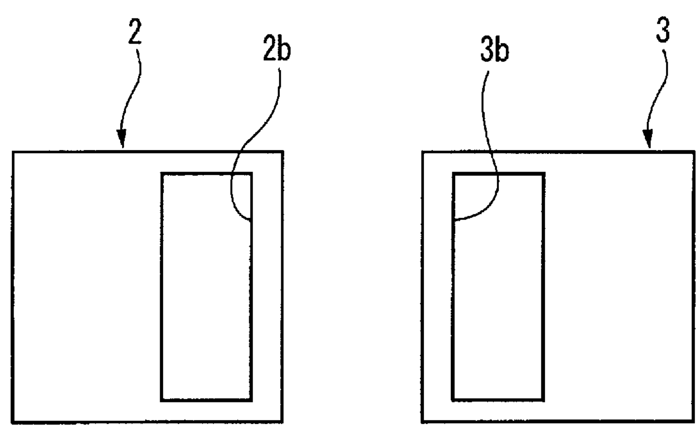

In FIGS. 2 to 10, in order to make the figures easily seen, one pixel of each phase difference detection pixel pair described in FIG. 22B is marked by 'X' and the other one is marked by 'Y'. The ordinary pixels are represented only by rectangular frames. Further, in the following description, a phase difference detection pixel X may be called an 'X pixel' and a phase difference detection pixel Y may be called a 'Y pixel'.

Figure 2:
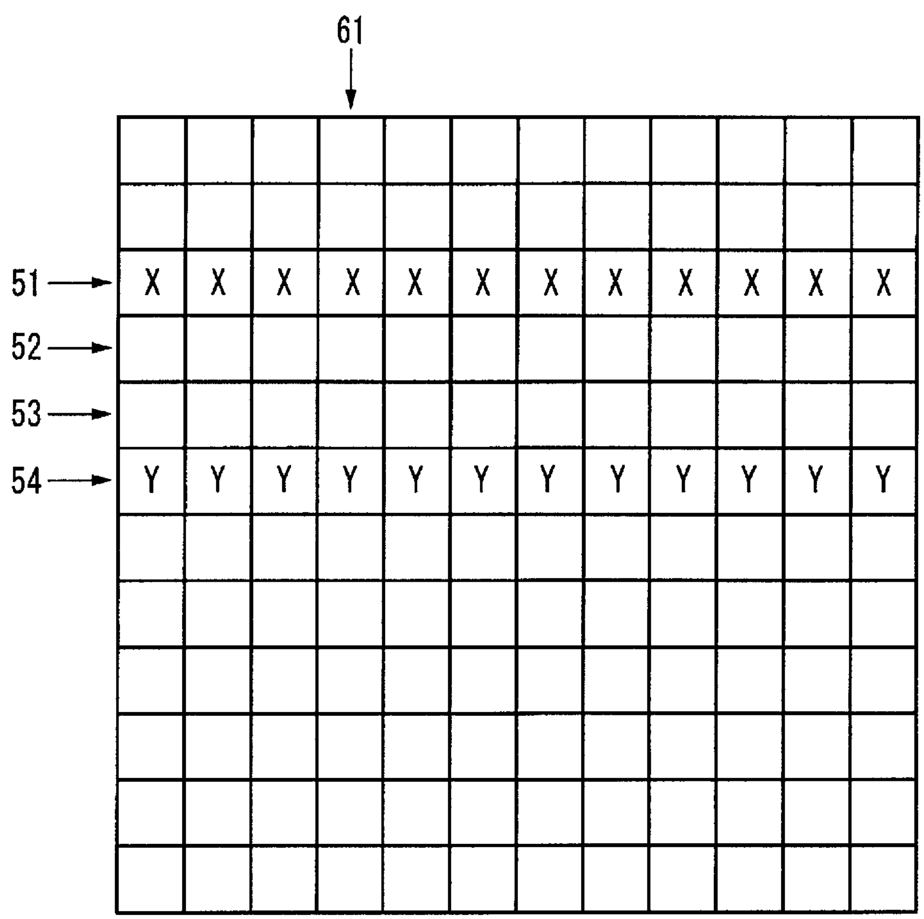
FIG. 2 is a view illustrating an array example of phase difference detection pixel pairs in an imaging element according to an exemplary embodiment of the present invention.

In an example illustrated in FIG. 2, the same horizontal line (the same pixel row) 51 is filled with phase difference detection pixels X without a gap and the same pixel row 54 downwardly spaced apart from the horizontal 51 by three horizontal lines is filled with phase difference detection pixels Y without a gap. 'Without gap' means that there is not even a gap of one pixel, that is, no ordinary pixel is placed, between horizontally adjacent phase difference detection pixels.

Further, 'in a pixel group within a predetermined area of the color imaging element, the phase difference detection pixels are placed in all horizontal components' represents a state in which the phase difference pixels are arranged in all horizontal pixel positions in the predetermined area when the color imaging element is viewed in a vertical direction. That is, it refers to a state in which, as a result of moving the phase difference detection pixels on each vertical line in the vertical direction and rearranging the phase difference pixels in one horizontal row (for example, a third row), there is not even a gap of one pixel and phase difference detection pixels are placed entirely in the horizontal direction. For example, in FIG. 5 to be described below, the X pixels are formed at all the horizontal positions when it is disregarded that vertical placement positions are different from each other. Herein, a pixel group within a predetermined area includes a pixel group within a part of the entire pixel group placed in the imaging element, but the pixel group may be the pixel group in the entire area.

Further, 'in a pixel group within a predetermined area of the color imaging element, the phase difference pixels are placed in all vertical components' represents a state in which all of the phase difference detection pixels are arranged in the vertical direction in the predetermined area when viewed in the horizontal direction. That is, it refers to a state in which, as a result of moving the phase difference detection pixels on each horizontal line in the horizontal direction and rearranging the phase difference detection pixels in one vertical column (for example, a third column), there is not even a gap of one pixel and the phase difference detection pixels are placed entirely in the vertical direction. For example, in a 6×6 pixel group in a lower left part of FIG. 9 to be described below, when the Y pixels are moved to a first column, the Y pixels are arranged in a column direction without a gap of one pixel. That is, the Y pixels are formed at all the vertical positions when it is disregarded that the horizontal placement positions thereof are different from each other. Similarly, a pixel group within the predetermined area includes a pixel group within an area of a part of the entire pixel group placed in the imaging element, but the pixel group may be a pixel group in the entire area.

A combination of XY that makes a pair includes an X pixel and a Y pixel on the same vertical line (for example, the same pixel column 61). The pair pixels XY may deviate from each other in the vertical direction to this extent or several times this extent. This will not cause any problem in acquiring phase difference information since, for example, in a recent imaging element with 10 megapixels or more, it may be though that an image on the same horizontal line of the same subject is incident on the pair pixels XY.

Figure 24:
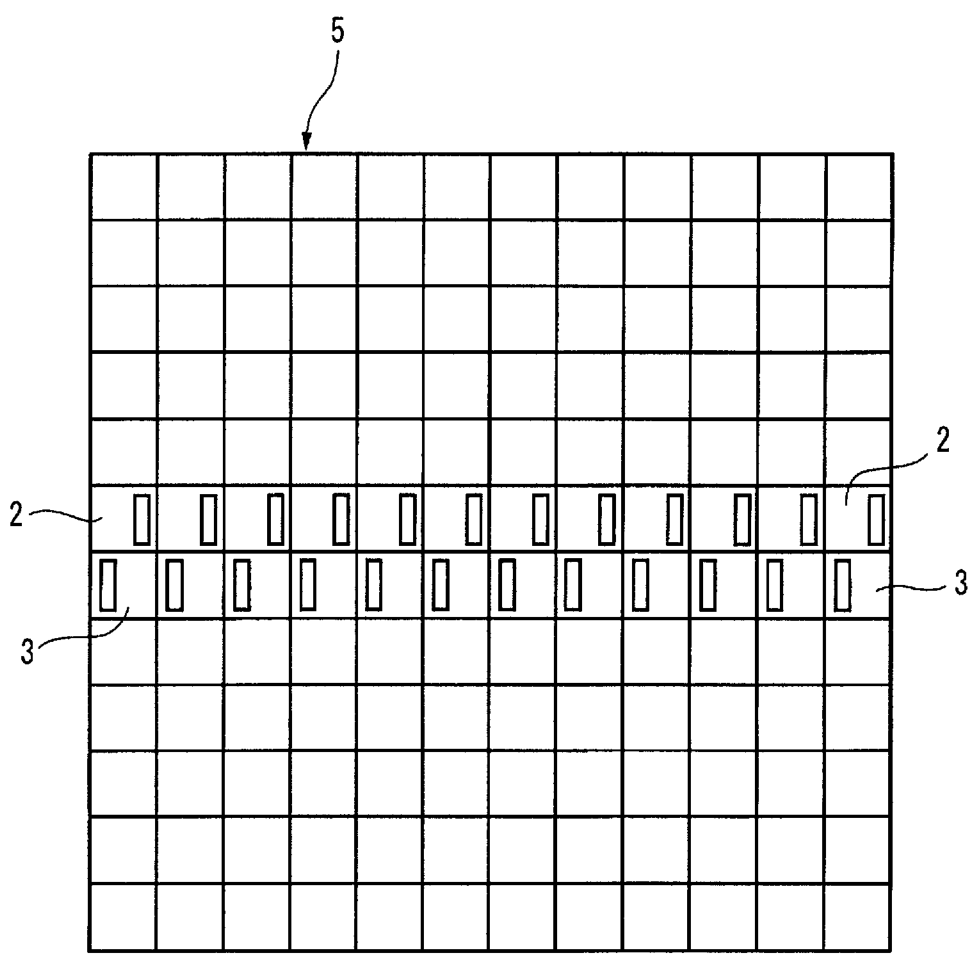
FIG. 24 is a view illustrating an array example of phase difference detection pixel pairs different from FIG. 23.

When comparing the example of FIG. 2 with an example of FIG. 24, in FIG. 2, ordinary pixel lines 52 and 53 are present between a horizontal line 51 formed with X pixels and a horizontal line 54 formed with Y pixels. As a result, when a captured image signal at an X pixel position is obtained through pixel interpolation, it may be calculated using captured image signals of ordinary pixels of the lines 52 and 53 as well. As a result, pixel interpolation precision is improved and image quality is increased.

Figure 3:
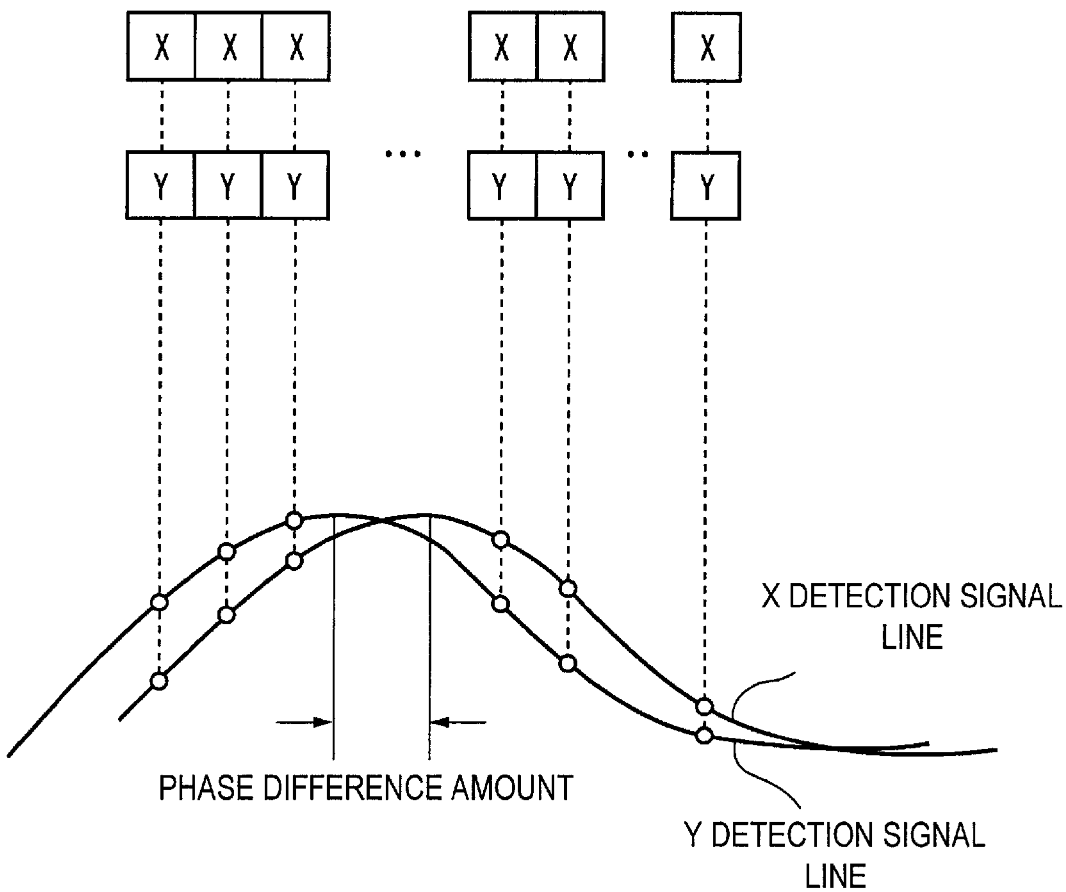
FIG. 3 is an explanatory view of phase different information acquired by detection signals of the phase difference detection pixel pairs.

Here, descriptions will be made on distribution data of phase difference information obtained when the phase difference detection pixel pairs XY, which are adjacent to each other in the vertical direction, are arranged in the horizontal direction with a pair as a unit. FIG. 3 is a view illustrating distribution data of phase difference information detected by the AF detection circuit 41 of FIG. 1. Although phase difference detection pixel pairs XY arranged in horizontal rows 51 and 54 of FIG. 2 are spaced apart from each other by 3 pixel rows, it may be thought that light emitted from a position on the same horizontal line in a subject is incident on a horizontal line of the phase difference detection pixel pairs XY on the imaging element.

As can be seen from FIG. 22B, a phase difference detection pixel X has a light shielding film opening 2*b* which is eccentric to the right from a pixel center. When this is viewed from the pixel side, the light shielding film opening 2*b* is formed as an opening at a left eye side. On the contrary, a light shielding film opening 3*b* of a phase difference detection pixel Y is formed as an opening at a right eye side.

That is, an X detection signal line that connects detection signal values detected by the respective phase difference detection pixels X of the horizontal line and a Y detection signal line that connects detection signal values detected by the phase difference detection pixels Y of the horizontal line deviate from each other by a left-right a parallax amount, that is, a phase difference amount when the same subject is viewed with left and right eyes. When the deviation amount (phase difference amount) is obtained, a distance up to the subject may be calculated.

Upon receiving the data of FIG. 3 from the AF detection circuit 41, the CPU 40 of FIG. 1 moves a focus lens position of the photographing lens 29 to a position where the subject is focused. By the movement, the deviation between two detection signal lines, i.e. the X detection signal line and the Y detection signal line of FIG. 3 is decreased and both the signals lines superimpose on each other at the focusing position. As such, AF processing is executed.

Figure 23:
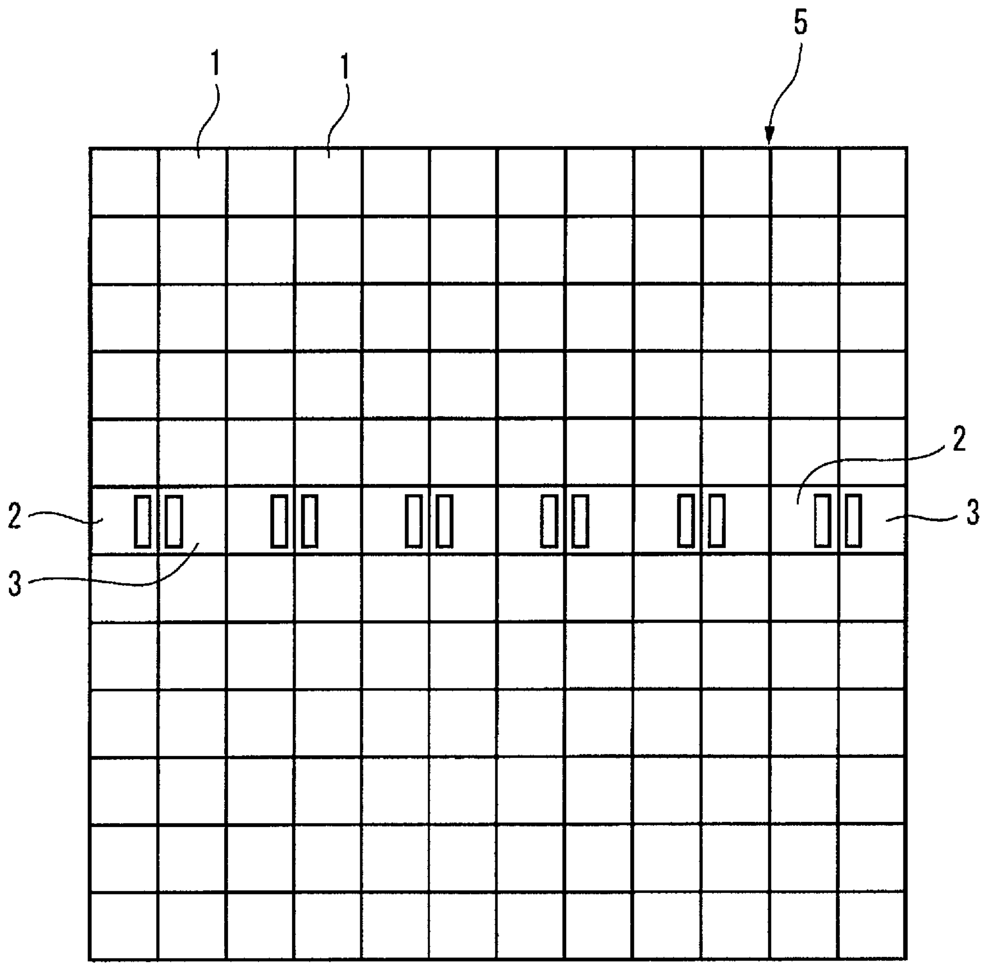
FIG. 23 is a view illustrating an array example of phase difference detection pixel pairs in the related art.

Plot points on the X detection signal line illustrated in FIG. 3 are detection signal amounts of X pixels, respectively. When the pair pixels XY are arranged to be adjacent to each other in the horizontal direction as illustrated in FIG. 23, the density of the plot points of the X detection signal line becomes half the density in FIG. 3. As a result, phase difference information obtained in FIG. 3 become higher than that obtained in FIG. 23.

When the phase difference information having high resolution is obtained, the X pixel and the Y pixel that constitute a pair are spaced apart from each other by 3 pixels in the example of FIG. 2. However, even if the X and Y pixels are further spaced apart from each other by 6 pixels, it may be thought that light emitted from the same subject position enters the pair pixel in a 10 megapixel class imaging element capable of photographing a high-definition image.

Figure 4:
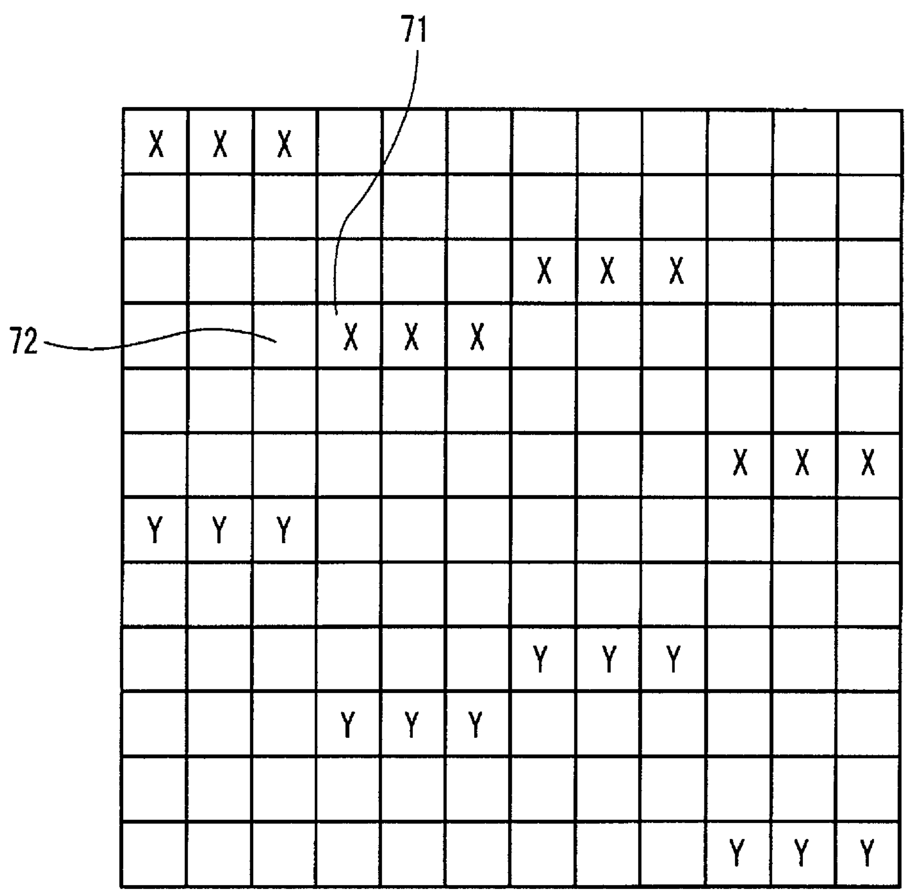
FIG. 4 is a view illustrating an array example of phase difference detection pixel pairs in an imaging element according to another exemplary embodiment of the present invention.

Therefore, the array of the phase difference detection pixel pairs XY illustrated in FIG. 4 may be considered. In the example of FIG. 2, the X pixels are filled on the same horizontal line without a gap. However, in the example of FIG. 4, every three horizontal pixels are displaced from each other in the vertical positions of the X pixels and the positions of the Y pixels to be paired are also correspondingly displaced.

When a vertical displacement is also disregarded in the example of FIG. 4, an X pixel and a Y pixel that constitute a pair are present in any vertical line (pixel column). As a result, it is possible to obtain distribution data of the phase difference information having the same resolution as that in the constitution example of FIG. 2.

Moreover, in the case of the configurational example of FIG. 4, for example, an ordinary pixel 72 is present at the same vertical position (same horizontal line) as an X pixel 71. As a result, when a captured image signal of the X pixel 71 is calculated through pixel interpolation, a captured image signal of the ordinary pixel 72 may also be used for the calculation, and the quality of the captured image may be improved.

Figure 5:
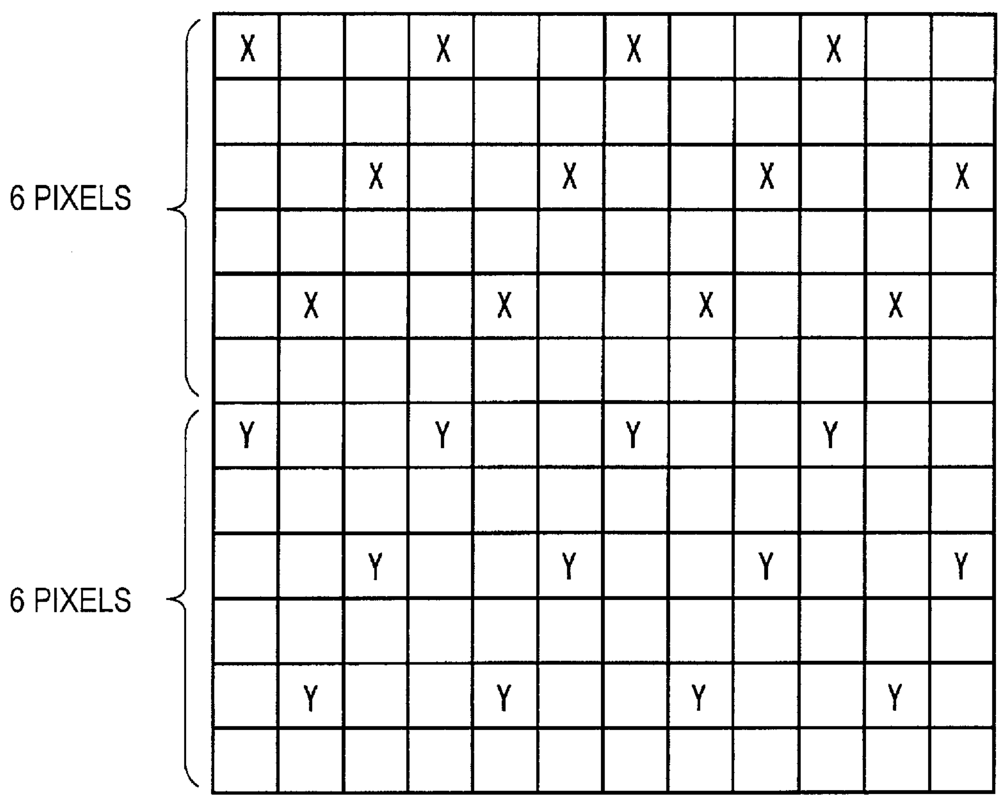
FIG. 5 is a view illustrating an array example of phase difference detection pixel pairs in an imaging element according to yet another exemplary embodiment of the present invention.

FIG. 5 illustrates an array example of the pixels of FIG. 4 in which the pixels are further dispersed such that any phase difference detection pixel does not have a different phase difference pixel at the surrounding pixel positions and a distance corresponding to six pixels exists between an X pixel and a Y pixel that constitute a pair. When the vertical displacement is disregarded, the horizontal resolution of the phase difference information may be maintained highly since a phase difference detection pixel pair XY exists in any vertical line (pixel column). Further, in the example of FIG. 5, array positions of the phase difference detection pixels are made to be the same with a pixel group of longitudinal 6 pixels×lateral 12 pixels as a unit.

According to the array example of FIG. 5, no phase difference detection pixel but ordinary pixels exist at neighboring locations. That is, a phase difference detection pixel is placed at a position vertically and horizontally different from other phase difference detection pixels placed on a line of pixels in any one direction of the horizontal direction and the vertical direction adjacent to the phase difference detection pixel. As a result, correction precision at the time of obtaining a captured image signal of the phase difference detection pixel through pixel interpolation is improved and as a result, it becomes possible to obtain a captured image of higher quality.

Figure 6:
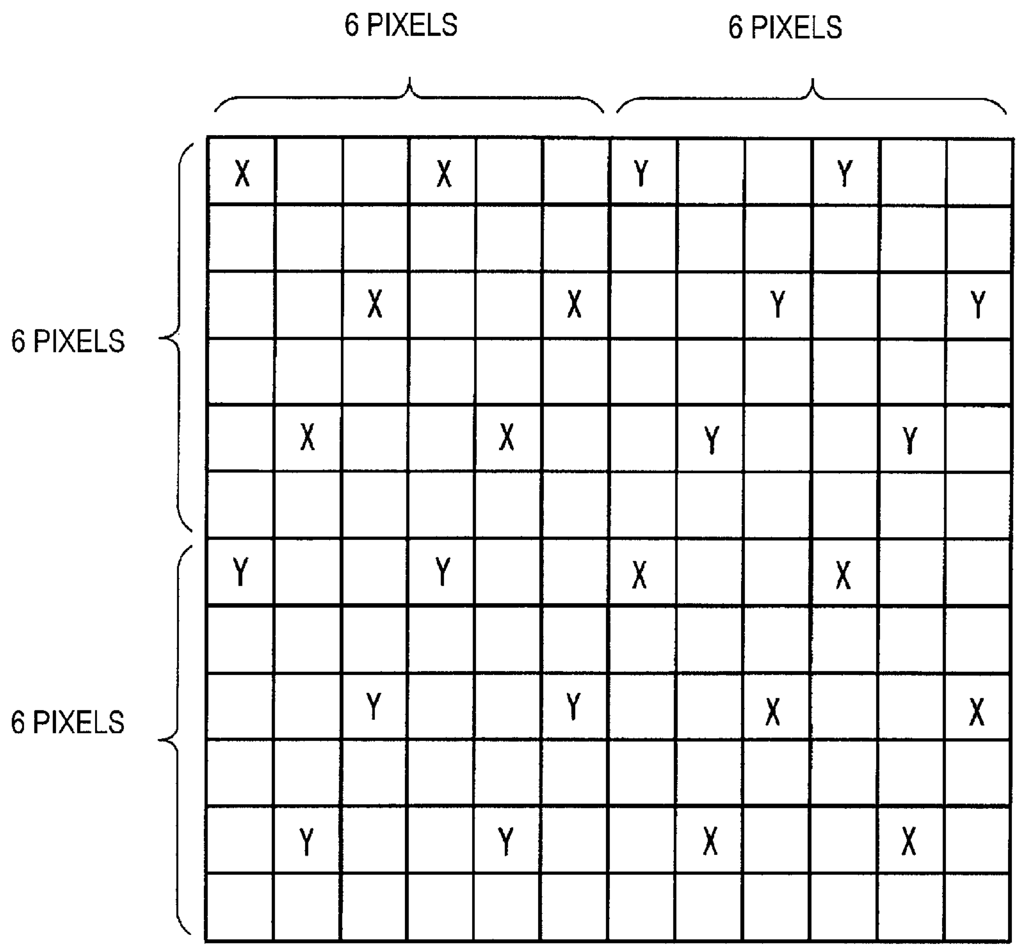
FIG. 6 is a view illustrating an array example of phase difference detection pixel pairs in an imaging element according to yet another exemplary embodiment of the present invention.

In an array example of FIG. 6, placement positions of the phase difference detection pixels are the same as those of the example of FIG. 5. However, the 12×12 pixel group is divided into four 6×6 pixel groups and phase difference detection pixels (the X pixels in FIG. 5) of the upper right 6×6 pixel group are set as Y pixels in FIG. 6 and phase difference detection pixels (the Y pixels in FIG. 5) of the lower right 6×6 pixel group are set as X pixels in FIG. 6.

When the pair pixel XY is configured to be formed in the horizontal direction as well as in the vertical direction, it is possible to obtain the distribution data of the vertical phase difference information as well as to obtain the distribution data of the horizontal phase difference information.

Figure 7:
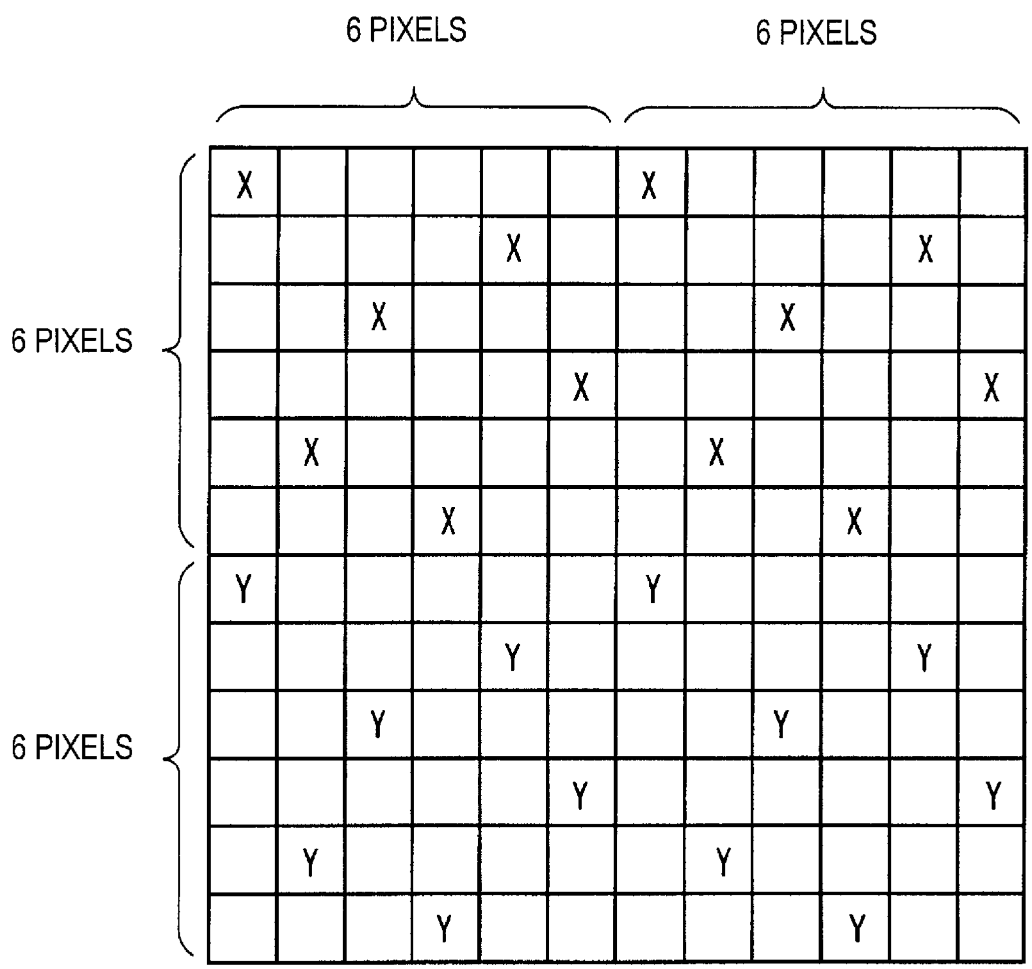
FIG. 7 is a view illustrating an array example of phase difference detection pixel pairs in an imaging element according to yet another exemplary embodiment of the present invention.

FIG. 7 is a view illustrating another array example of phase difference detection pixels. Like the placement array of FIG. 5, 6 phase difference detection pixels are formed in a pixel group with a 6×6 pixel group as a unit. However, unlike FIG. 5, one phase difference detection pixel is formed without fail either on any horizontal line (pixel row) or on any vertical line (pixel column). Further, a distance between the X pixel and the Y pixel that constitute a pair in the vertical direction is set as 6 pixels.

In an array example of FIG. 7, a configuration, in which X pixels are formed in a pixel group of longitudinal 6 pixels× lateral 12 pixels and, to be in contact with the bottom of the pixel group, Y pixels are formed in a pixel group of longitudinal 6 pixels×lateral 12 pixels contacting the bottom thereof, is repeated, like the array example of FIG. 5. In this regard, in an array example of FIG. 8, the 12×12 pixel group is divided into four 6×6 pixel groups like FIG. 6, and the Y pixels are placed in the upper right pixel group and the X pixels are placed in the lower right pixel group, in contrast to the array example of FIG. 7.

Figure 8:
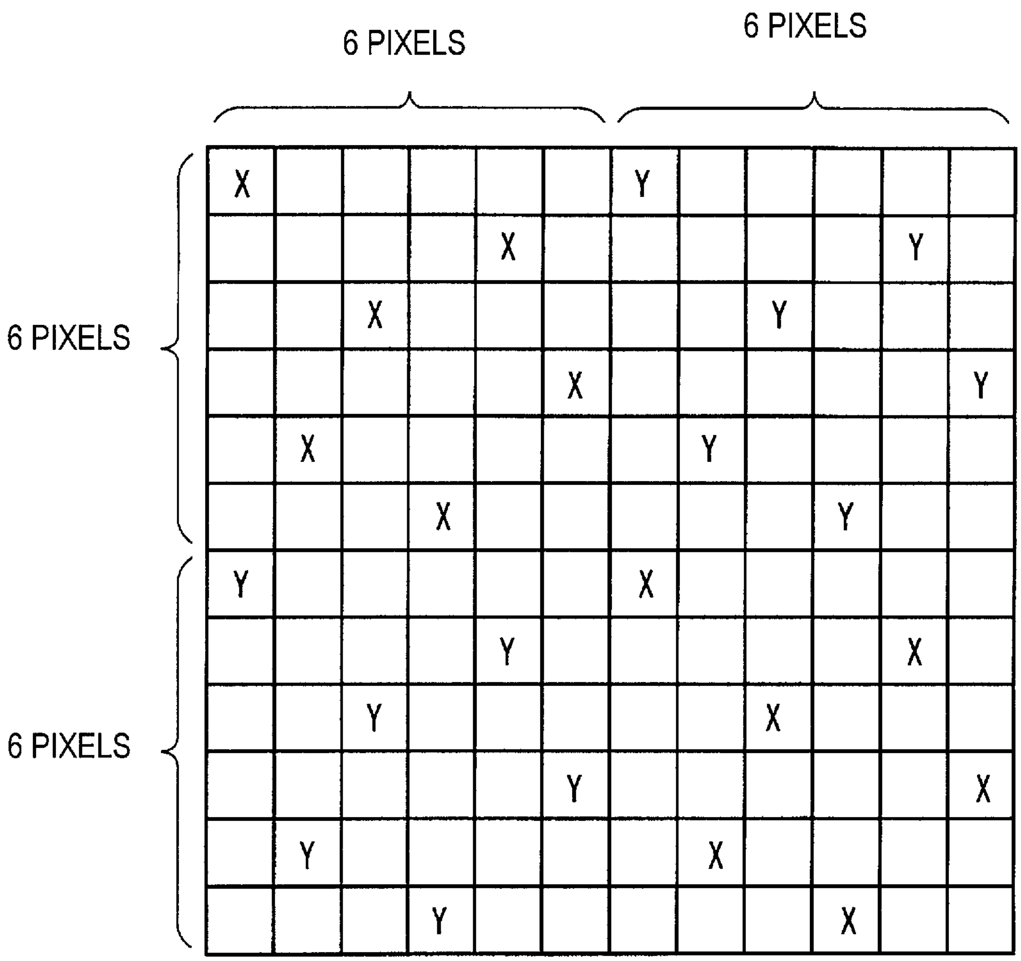
FIG. 8 is a view illustrating an array example of phase difference detection pixel pairs in an imaging element according to yet another exemplary embodiment of the present invention.

According to the array example of FIG. 8, when an X pixel and a Y pixel arranged in the vertical direction are set as a pair pixel, the pair pixel is present on each vertical line. As a result, high-resolution phase difference information may be obtained in the horizontal direction. Further, when an X pixel and a Y pixel arranged in the horizontal direction are set as a pair pixel, the pair pixel is present on each horizontal line. As a result, high-resolution phase difference information may be obtained in the vertical direction.

FIG. 9 is a view illustrating yet another array example. In this example, among pixels arranged in a square lattice form, the X pixels are consecutively filled without a gap in a direction (hereinafter, referred to as an oblique direction) parallel to a diagonal line that connects an upper left angle and a lower right angle of the square lattice and the Y pixels are filled without a gap in an oblique direction spaced away from the X pixels by 6 pixels either in the horizontal direction or in the vertical direction.

An X pixel and a Y pixel on the same vertical line may be set as a pair pixel or an X pixel and a Y pixel on the same horizontal line may be set as a pair pixel. The distribution data of the phase difference information according to the present example may be obtained either in the horizontal direction or in the vertical direction and the resolution is high either in the horizontal direction or in the vertical direction becomes high like the phase difference pixel array of FIG. 2.

FIG. 10 is a modified example of FIG. 9. Phase difference detection pixels adjacent to the oblique direction are alternately formed as an X pixel, a Y pixel, an X pixel, a Y pixel, and so on. In addition, when one of two phase difference detection pixels at the same horizontal position (alternatively, the same vertical position) of two phase difference detection pixel lines adjacent to the oblique direction is set to an X pixel and the other one is set to a Y pixel, the phase difference information in the horizontal direction and the vertical direction may be obtained in high resolution like the case of FIG. 9.

In an array example of FIG. 10, a set of an X pixel and a Y pixel adjacent to the oblique direction may be set as the pair pixels. In this case, the phase difference information in the horizontal direction and the vertical direction may be obtained with the resolution obtained with the layout of FIG. 23 (half the resolution of FIG. 9).

Since a lot of ordinary pixels are also present at the same vertical position and the same horizontal position of the phase difference detection pixel in the layout of the phase difference detection pixels in the oblique direction illustrated in FIGS. 9 and 10, the captured image signal of a phase difference detection pixel may be obtained with high precision by the pixel interpolation.

FIG. 11A is a view illustrating a color filter array suitable for applying the array examples of the phase difference detection pixel described in FIGS. 2 to 10. Blank rectangular frames are G pixels (the term is used to refer to pixels with a G color filter. An R pixel and a B pixel are used as the same meaning), but 'G' marks are omitted for so as to make the drawing easily seen.

The color filter array is formed by alternately and repeatedly arraying a first array of FIG. 11B and a second array of FIG. 11C either in the horizontal direction or in the vertical direction.

In the first array of FIG. 11B, 5 pixels at the center and 4 corners of a 3×3 pixel group are set as G filters, and 2 pixels of the same pixel column among 4 pixels other than the 5 pixels are set as R filters and two remaining pixels are set as B filters. Further, as illustrated in FIG. 11C, an array pattern in which 2 pixels of the same pixel row among the 4 pixels are set as R filters and 2 remaining pixels are set as B filters becomes the second array.

When the first array and the second array illustrated in FIGS. 11B and 11C are alternately arrayed in the horizontal direction and the vertical direction, locations where four G pixels are formed as one lump are formed at discrete and periodic positions.

As a modified example of the color filter array of FIG. 11A, a color filter array may be considered in which only the first array of FIG. 11A is repeated in the horizontal direction and the vertical direction. Further, a color filter array may be considered in which only the second array of FIG. 11B is repeated in the horizontal direction and the vertical direction. In these cases, since the locations where the G filters are present are not changed, an exemplary embodiment to be described below may be similarly applied.

FIG. 12A is a view illustrating yet another modified example of the color filter array of FIG. 11A. An array of the modified example is formed by alternately placing a first array of FIG. 12A and a second array of FIG. 12C in the horizontal direction and the vertical direction.

The first array of FIG. 12B is configured such that 5 pixels at the center and 4 corners in a 3×3 pixel group are set as G filters, and 4 pixels other than the 5 pixels are divided into two parts in each of which two pixels are obliquely adjacent to each other, in 2 pixels in one part are set as R filters and 2 pixels at the other part are set as B filters. The second array of FIG. 12C is configured by setting the 2 pixels in the one part as the B filters and the 2 pixels in the other part as the R filters.

As a modified example of the color filter array of FIG. 12A, in the same manner as the foregoing, a color filter array may be considered in which only the first array of FIG. 12B or only the second array of FIG. 12C is repeatedly arrayed in the horizontal direction and the vertical direction.

Hereinafter, the arrays of the phase difference detection described in FIG. 2 to FIG. 10 are applied to the color filter arrays of total six (6) patterns of FIG. 11A and the variations thereof and FIG. 12A and the variations thereof. However, the present invention is not limited to the color filter arrays of the six (6) patterns and may be applied to a color filter that satisfies the following conditions. That is, (1) the color filter array is a color filter array which is arrayed on pixels square-lattice-arrayed in the horizontal direction and the vertical direction of the single-plate type color imaging element, (2) the color filter array includes a predetermined basic array pattern in which a first filter corresponding to a first color (for example, green) that contributes most to acquiring a luminance signal and second filters corresponding to two or more second colors (for example, blue and red) other than the first color are arrayed, (3) the basic array pattern is repeatedly placed in the horizontal direction and the vertical direction, (4) the first filter is placed in each line of horizontal, vertical, and oblique (diagonal) lines of the color filter array, (5) one or more second filters are placed in each line of the horizontal and vertical lines of the color filter array in the basic array pattern, and (6) the proportion of the number of pixels for the first color corresponding to the first filter is larger than the proportion of the number of pixels for each color of the second colors corresponding to the second filters.

According to the color imaging element that satisfies the above-described conditions, since the first filter corresponding to the first color that contributes most to acquiring the luminance signal is placed in each line of the horizontal, vertical, and oblique lines of the color filter array, reproduction precision of synchronization (interpolation) processing (also referred to as de-mosaic processing) in a high-frequency area may be improved and further, since one or more second filters corresponding to two or more second colors other than the first color are placed in each line of the horizontal and vertical directions of the color filter array, generation of color Moiré (false color) may be suppressed to achieve high resolution.

In the color filter array, since a predetermined basic array pattern is repeatedly placed in the horizontal direction and the vertical direction, when the synchronization processing (interpolation) processing (also referred to as de-mosaic processing) is performed at a later stage, the processing may be performed according to a repetition pattern, and as a result, the latter stage processing may be simplified as compared to a random array in the related art.

Since the proportion of a pixel number for the first color corresponding to the first filter and the proportion of a pixel number for each color of the second colors corresponding to the second filters are made to be different from each other, in particular, since the proportion of the pixel number for the first color that contributes most to acquiring the luminance signal is larger than the proportion of the pixel number for each color of the second colors corresponding to the second filters, aliasing may be suppressed and high-frequency reproducibility may also be improved.

Preferably, the color filter array may include a part where the first filters are consecutive over two or more pixels in each line of the horizontal, vertical, and oblique lines. As a result, a direction (a direction having a high correlation) which is small in change of luminance in the horizontal, vertical, and oblique directions may be determined with a minimum pixel interval.

The color filter array may include a square array corresponding to 2×2 pixels constituted by the first filters. The direction having the high correlation among the horizontal, vertical, and oblique directions may be determined by using pixel values of the 2×2 pixels.

More preferably, color filter arrays in a predetermined basic array pattern may be point-symmetric to each other around the center of the basic array pattern. As a result, it is possible to reduce a circuit scale of the processing circuit at the latter stage.

More preferably, in the color filter array, the first filters may be placed at the center and four corners in the pixel group of 3×3 pixels and the pixel group of the 3×3 pixels is repeatedly placed in the horizontal direction and the vertical direction. Since the first filters are placed at four corners in the pixel group, when the pixel group is repeatedly placed in the horizontal direction and the vertical direction, the color filter array includes a square array corresponding to 2×2 pixels constituted by the first filters. The direction having the higher correlation among the horizontal, vertical, and oblique directions may be determined by using the pixel values of the 2×2 pixels and further, the first filters may be placed in each line of the horizontal, vertical, and oblique lines of the color filter array.

More preferably, the second filters may be placed in each line of the horizontal, vertical, and oblique lines of the color filter array. As a result, oblique color reproducibility may be further improved.

As a suitable exemplary embodiment of a color filter array that satisfies the above conditions, hereinafter, descriptions will be made using the color filter array of FIG. 11A. Although the color filter array of FIG. 11A represents a color filter array of a pixel group of longitudinal 12 pixels×12 lateral pixels, but has a structure in which a color filter array (basic pattern array) of a pixel group of longitudinal 6 pixels× lateral 6 pixels is repeated in the horizontal direction and in the vertical direction. This is also applicable to other modified examples. As a result, a layout of the phase difference detection pixels in a 6×6 pixel group may set as a basic pattern and the color imaging element may be formed by repeatedly arraying the basic pattern.

Hereinafter, after FIG. 13, the phase difference detection pixels will be marked as 'X' and 'Y'. When the phase difference detection pixels X and Y are placed, it is desirable to satisfy the following conditions. However, since it is difficult to satisfy all the conditions, a phase difference detection pixel will be formed at a position to satisfy the conditions as much as possible.

Conditions regarding the layout of phase difference detection pixels:

(1) In order to increase the resolution (resolving power) of the phase difference information, the phase difference detection pixels should be placed compactly without a gap in the horizontal direction, if possible.

(2) In order to calculate a captured image signal of a phase difference detection pixel with high precision by the pixel interpolation, the phase difference detection pixel should be placed at a place where a large number of concolorous ordinary pixels are present around the phase difference detection pixel.

(3) Since an imaging element may image a moving image by thinning reading, a phase difference detection pixel line should be formed at a position where it does not superimpose on a reading pixel line.

(4) In order to suppress an influence by a color mixture, an R pixel should not be positioned adjacent to a phase difference detection pixel.

Figure 13:
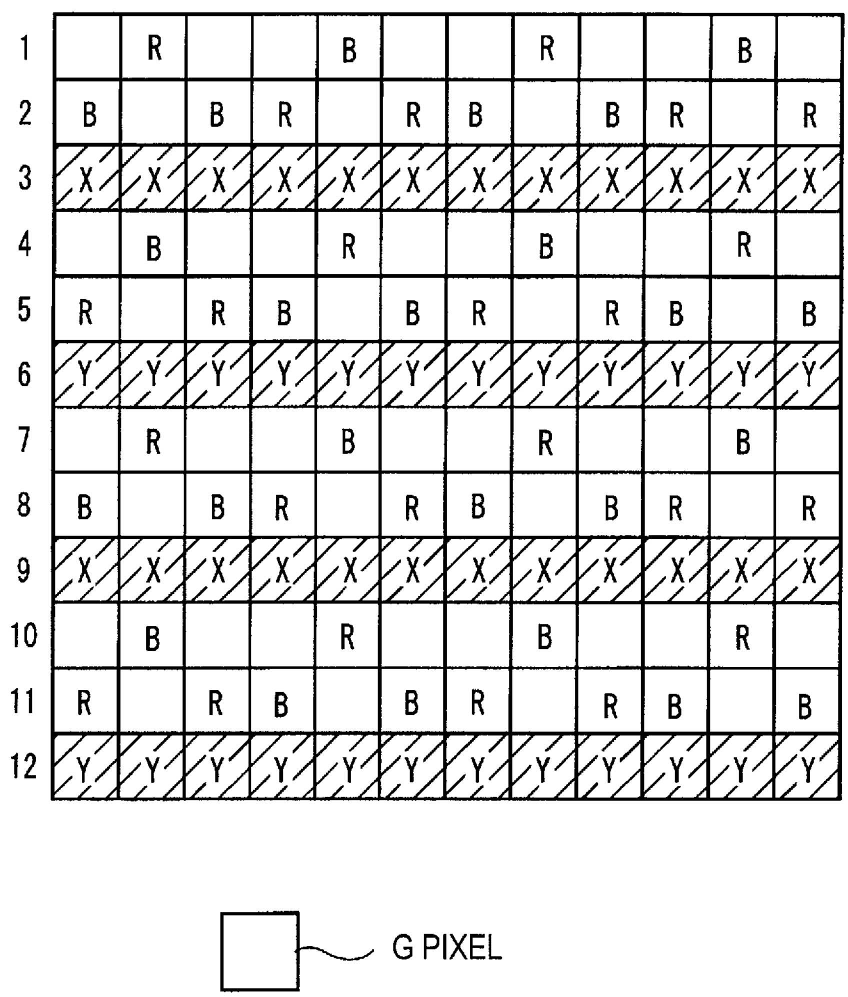
FIG. 13 is a view illustrating an exemplary embodiment in which the array example of the phase difference detection pixel pairs of FIG. 2 is applied to the color filter array illustrated in FIGS. 11A to 11C.

FIG. 13 is a view in which the array example of the phase difference detection pixels described in FIG. 2 is applied in a color filter array. X pixels and Y pixels are hatched so that the phase difference detection pixel positions may be easily found.

As can be seen from the color filter array of FIG. 11A, lines (second, fifth, eighth, and eleventh horizontal lines) in which the G pixels are sparse and lines in which the G pixels are compact are present. Therefore, in the present exemplary embodiment, as illustrated in FIG. 13, all pixels of a third (and ninth) horizontal lines in which the G pixels are compact are set by X pixels and all pixels of sixth (and twelfth) horizontal lines in which the G pixels constituting the pair pixels together with the X pixels are compact are set by Y pixels.

Originally, a proportion of G pixels in the color imaging element is higher than those of R pixels and B pixels. As a result, even though the G pixels, of which the number is larger than the number of the R pixels and the B pixels, become the phase difference detection pixels not to be used for capturing for a subject image, the G pixels do not degrade the quality of a captured color image.

In the exemplary embodiment of FIG. 13, a distance corresponding to three pixels is emptied between the X pixels and the Y pixels that constitute pairs so as to increase interpolation precision of the captured image signals of the X pixels and the Y pixels. In the constitution of FIG. 13, each X pixel and each Y pixel are equipped with concolorous color filters, for example, G (green) color filters, are free of a color filter, or are equipped with a transparent filter or a white filter. Here, the transparent filter and the white filter are filters that filtrate all of red wavelength area light, blue wavelength area light, and green wavelength area light, and the transparent filter has a relatively high optical transmittance (for example, an optical transmittance of 70% or more) and the white filter has an optical transmittance lower than the transparent filter.

When horizontal lines are set as phase difference detection pixel lines as in the present exemplary embodiment, it would be get better, for example, if detection signals of the phase difference detection pixel lines are read when a high-definition still image is picked and further, phase difference information of high resolution is required. In addition, when photographing a moving image, the photographing is terminated when captured image signals of ordinary R, G, and B pixels other than the phase difference detection pixels are read by thinning reading without reading the signal of the phase difference detection pixel line.

When moving image data is read from the color imaging element by a pixel thinning operation, various pixel thinning reading methods such ½ pixel thinning, ⅓ pixel thinning, even line thinning, odd line thinning may be used. However, when the CPU 40 has known in advance which place of the color imaging element 31 the phase difference detection pixel lines are formed, the CPU 40 may correspondingly instruct the timing generator 47 to read the captured image signal by skipping a phase difference detection pixel line.

FIG. 14 is an explanatory view of a modified example of FIG. 13. In the example of FIG. 13, 4 horizontal lines among longitudinal 12 pixels are set as the phase difference detection pixel lines. An exemplary embodiment in which the phase difference detection pixel lines are set as 2 horizontal lines and the X pixels are present on a third horizontal line and the Y pixels are present on a ninth horizontal line is illustrated in FIG. 14.

Figure 15:
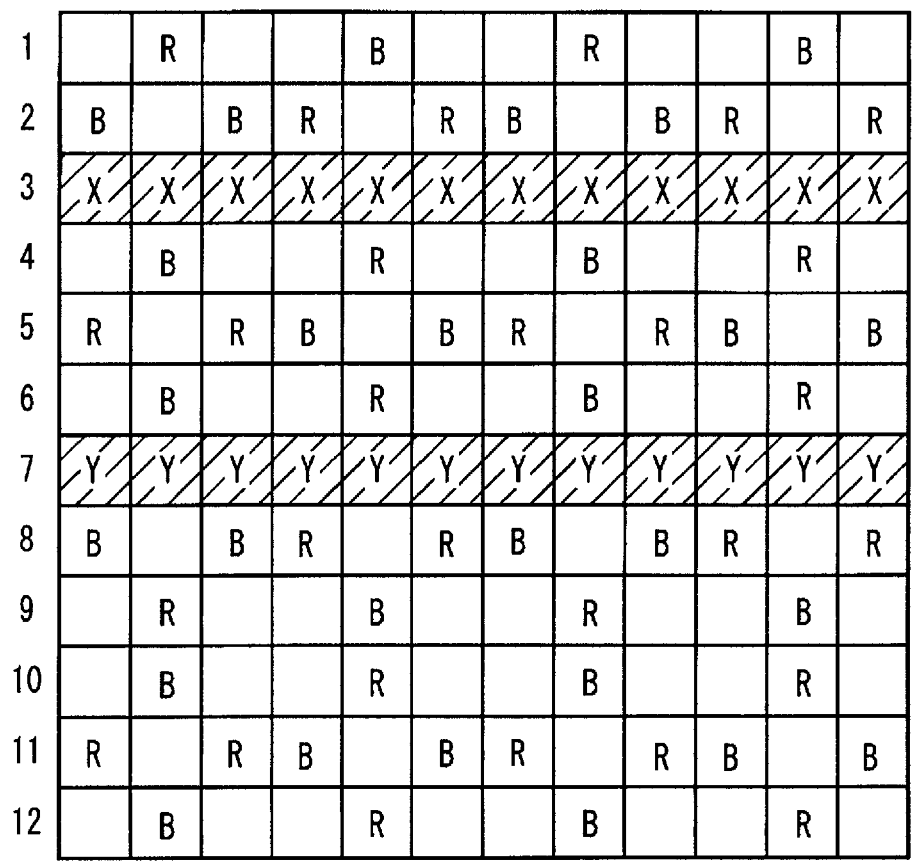
FIG. 15 is a view illustrating another modified example of the exemplary embodiment illustrated in FIG. 13.

In the example of FIG. 14, the horizontal line of the X pixels and the horizontal line of the Y pixels that constitute a pair are spaced apart by 6 pixels. However, the spacing is not limited to the distance of 6 pixels, but for example, the spacing may be a distance of 4 pixels as illustrated in FIG. 15. Most of all, it is desirable that the X pixel line and the Y pixel line are formed on the horizontal lines where the G pixels are compactly present.

Figure 16:
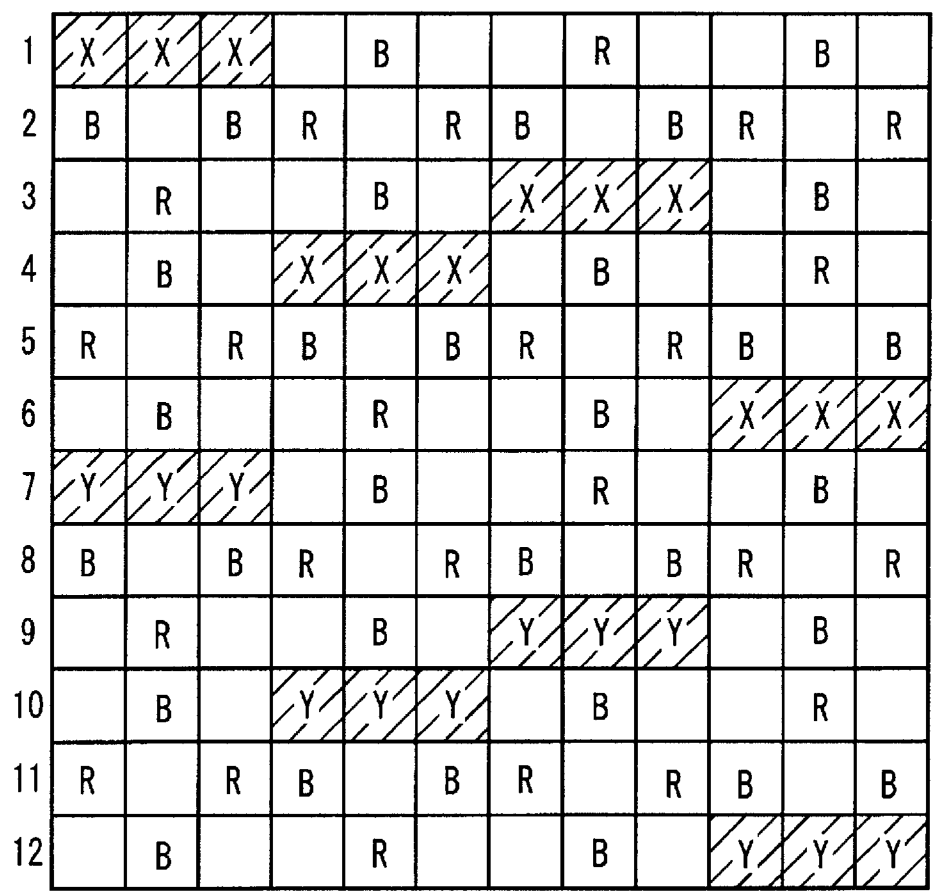
FIG. 16 is a view illustrating an exemplary embodiment in which the array example of the phase difference detection pixel pairs of FIG. 4 is applied to the color filter array illustrated in FIGS. 11A to 11C.

FIG. 16 illustrates an exemplary embodiment in which the phase difference detection pixel array example described in FIG. 4 is applied to the color filter array of FIG. 11A. While phase difference detection pixels are made to be consecutive by three pixels in the horizontal direction, the phase difference detection pixel positions are displaced by three pixels in the vertical direction. Each three phase difference detection pixels are formed on a horizontal line where G pixels are dense.

When a G pixel in a horizontal line where G pixels are sparse is set as a phase difference detection pixel, it is difficult to enhance interpolation precision of a captured image signal of the G pixel. As a result, it is desirable that the horizontal line where the G pixels are sparse is not set as a phase difference detection pixel line.

In the example of FIG. 16, the second horizontal line, the fifth horizontal line, the eighth horizontal line, and the eleventh horizontal line are the horizontal lines where no phase difference detection pixel is present. As a result, when the thinning reading is performed, the captured image signals of the second, fifth, eighth, and eleventh horizontal lines should be read. Further, in the exemplary embodiment of FIG. 16, the condition (4) regarding the layout of the phase difference detection pixels is also satisfied.

Figure 17:
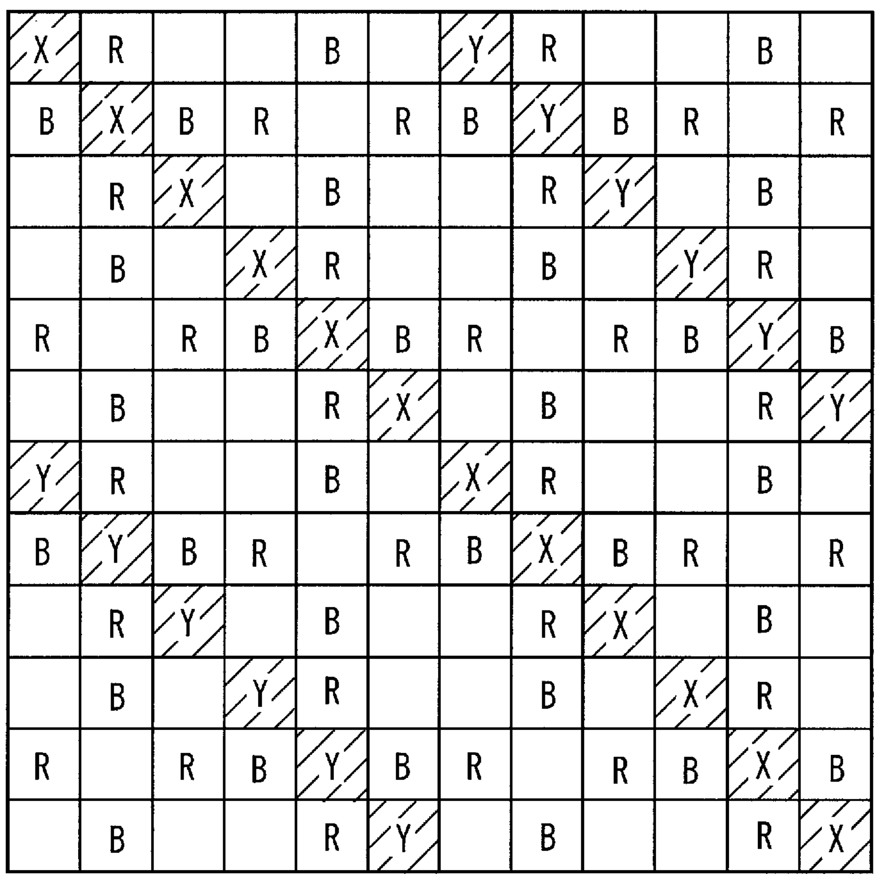
FIG. 17 is a view illustrating an exemplary embodiment in which the array example of the phase difference detection pixel pairs of FIG. 9 is applied to the color filter array illustrated in FIGS. 11A to 11C.

FIG. 17 illustrates an exemplary embodiment in which the phase difference detection pixel array example of FIG. 9 is applied to the color filter array of FIG. 11A. X pixels or Y pixels are filled with a gap in an oblique direction. Since ordinary pixels such as R pixels, G pixels, and B pixels are present around any phase difference detection pixel X or Y, the precision at the time of obtaining captured image signals of the pixels X and Y through the pixel interpolation is improved.

Further, in FIG. 17, an X pixel and a Y pixel that constitute a pair are spaced apart from each other by 6 pixels, but in an oblique line spaced downward therefrom by three, pixels to be paired may be filled without a gap. In addition, the phase difference detection pixel array example of FIG. 10 may be applied thereto. In the exemplary embodiment in which X and Y pixels are filled obliquely and consecutively without a gap, a phase difference detection pixel is present in any horizontal line. Thus, the captured image signals of the phase difference detection pixel positions need to be pixel-interpolated by the neighboring pixels when a moving image is prepared by selecting and reading the pixels.

Figure 18:
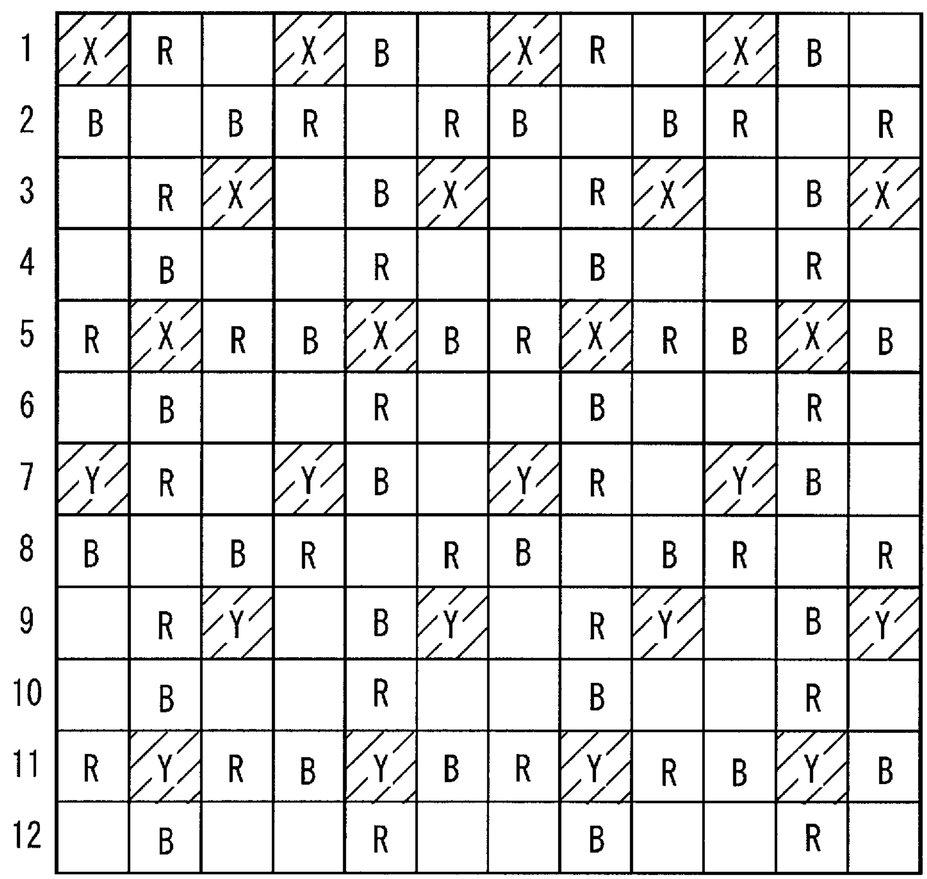
FIG. 18 is a view illustrating an exemplary embodiment in which the array example of the phase difference detection pixel pairs of FIG. 5 is applied to the color filter array illustrated in FIGS. 11A to 11C.

FIG. 18 illustrates an exemplary embodiment in which the phase difference detection pixel array example of FIG. 5 is applied to the color filter array of FIG. 11A. Since all of 8 surrounding pixels of any phase difference detection pixel become ordinary pixels and 20 pixels among 24 surrounding pixels become ordinary pixels, the interpolation precision of a captured image signal is improved. Further, since phase difference detection pixels are formed only on odd horizontal lines and even horizontal lines are constituted only with ordinary pixels, it will be better when the even lines are read at the time of reading a moving image. In addition, a counter side of a pair pixel may be changed by applying the phase difference detection pixel array example of FIG. 6.

Figure 19:
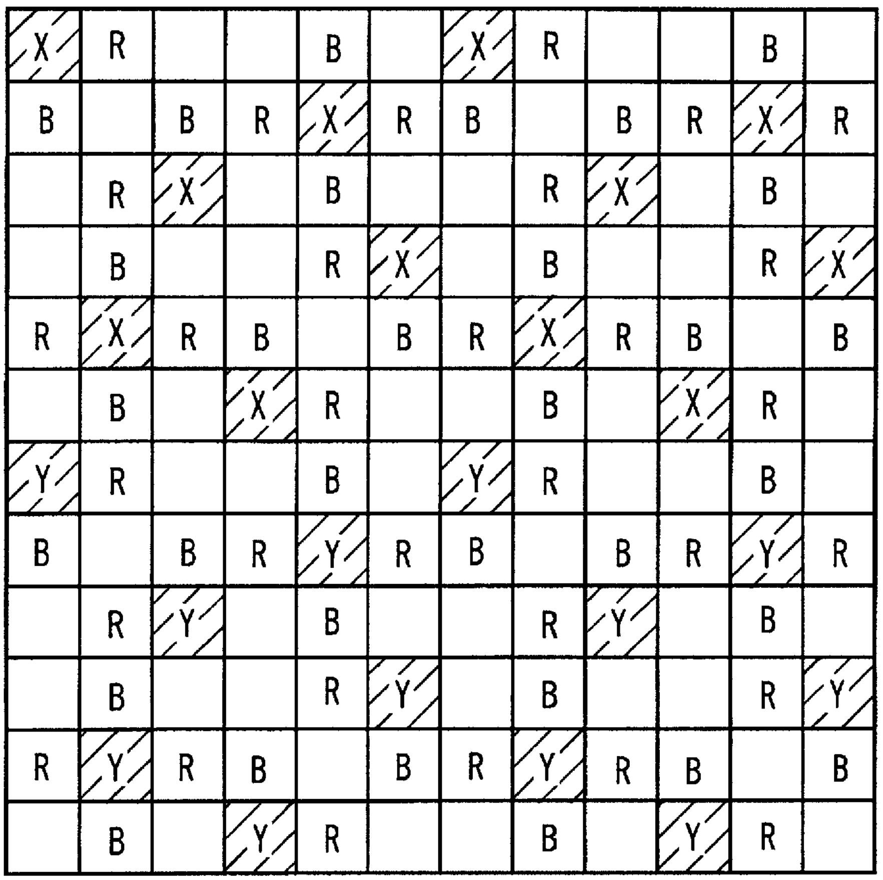
FIG. 19 is a view illustrating an exemplary embodiment in which the array example of the phase difference detection pixel pairs of FIG. 7 is applied to the color filter array illustrated in FIGS. 11A to 11C.

FIG. 19 illustrates an exemplary embodiment in which the phase difference detection pixel array example of FIG. 7 is applied to the color filter array of FIG. 11A. In the exemplary embodiment, since all of 8 surrounding pixels of any phase difference detection pixel become the ordinary pixels and 21 pixels among 24 surrounding pixels become ordinary pixels, the interpolation precision of a captured image signal is improved. In addition, a counter side of a pair pixel may be changed by applying the phase difference detection pixel array example of FIG. 8.

In FIG. 20, a pattern in which two color filter arrays (longitudinal 12 pixels×lateral 12 pixels) of FIG. 11A are arrayed in the vertical direction is set as a basic pattern of the phase difference detection pixel layout. The X pixels are placed in such a manner that one X pixel is placed in each vertical line of an upper 12×12 pixel group and the phase difference detection pixels are not adjacent to each other in the horizontal direction. The Y pixels are placed in such a manner that one Y pixel is placed in each vertical line of a lower 12×12 pixel group and the phase difference detection pixels are not adjacent to each other in the horizontal direction. The X pixel placement positions and the Y pixel placement positions in each pixel group are set to be equal to each other.

FIG. 21 is a view illustrating another phase difference detection pixel array example in the color filter array of FIG. 11A. In the color filter array, there are the second horizontal line, the fifth horizontal line, the eighth horizontal line, and the eleventh horizontal line in which the G pixels are sparse and when the G pixels in the horizontal line in which the G pixels are sparse are not set as the phase difference detection pixels, the interpolation precision of a captured image signal by pixel interpolation is improved. As a result, the example of FIG. 21 is configured to slightly decrease the resolution of the phase difference information and increase the interpolation precision of the captured image signal. That is, one pixel in a G pixel lump of 2×2 pixels is set as a phase difference detection pixel and the phase difference detection pixel is not placed in a vertical line in which the G pixels are sparse.

According to the exemplary embodiments described above, phase difference information having high resolution can be obtained and a captured image signal of the phase difference detection pixel position can be interpolated with high precision. When the phase difference detection pixels are placed in such a manner that two phase difference detection pixels are not adjacent to each other in the horizontal and vertical directions, the resolution of the obtained phase difference information and interpolation precision of the captured image signal of the phase difference detection pixel position have a trade-off relationship in any sense.

However, an array as illustrated in FIGS. 11A and 11B, which satisfies the above-described color filter array conditions, may achieve both the high resolution of phase difference information and the high interpolation precision of a captured image signal.

Further, in the above-described exemplary embodiments, an example, in which the phase difference pixels X are compactly placed even without an interval of one pixel in the horizontal direction, for example, as illustrated in FIG. 2, is described. However, it is of course that when the imaging element is rotated by 90°, the horizontal direction of FIG. 2 becomes the vertical direction and each of the exemplary embodiments may be applied to the 90°-rotated imaging element as it is.

As discussed above, the exemplary embodiments disclose a color imaging element in which color filters of a predetermined color filter array are placed on a plurality of pixels constituted by photoelectric conversion elements arrayed in horizontal and vertical directions, in which the color filter array includes an array pattern of a 3×3 pixel group in which first filters corresponding to a first color that contributes most to acquiring a luminance signal and second filters corresponding to two or more second colors other than the first color are arrayed, and the first filters are placed at a center and 4 corners in the 3×3 pixel group, and the array pattern is repeatedly placed in the horizontal and vertical directions, the first filter is placed in a line of each of horizontal, vertical and oblique directions of the color filter array, a proportion of a number of pixels of the first color corresponding to the first filters is larger than a proportion of a number of pixels of each color of the second colors corresponding to the second filters, and in a pixel group within a predetermined area of the color imaging element, phase difference detection pixels for acquiring phase difference information are placed in entire components of one direction among components in the horizontal direction and components in the vertical direction in the pixel group.

The exemplary embodiments disclose the color imaging element in which in the pixel group within the predetermined area, a first phase difference detection pixel and a second phase difference detection pixel that constitute a pair are placed on a pixel line for ones of horizontal lines arrayed in the horizontal direction and vertical lines arrayed in the vertical direction, in order to detect a phase difference.

The exemplary embodiments disclose the color imaging element, in which the first and second phase difference detection pixels are formed on the pixels having the first filter.

The exemplary embodiments disclose the color imaging element, in which the phase difference detection pixels are placed on a pixel line for ones of the horizontal pixel lines and the vertical pixel lines in which a number of pixels with the first filters is relatively large.

The exemplary embodiments disclose the color imaging element, in which all pixels on a pixel line for ones of the horizontal pixel lines and the vertical pixel lines are set as the phase difference detection pixels and color filters of the phase difference detection pixels on the line are set as concolorous filters, transparent filters, or white filters.

The exemplary embodiments disclose the color imaging element, in which the color filter array includes an oblique line array in which the first filters are consecutively placed in an oblique direction and the phase difference detection pixel is placed on a pixel corresponding to the oblique line array of the first filter.

The exemplary embodiments disclose the color imaging element, in which first phase difference detection pixel of the first and second phase difference detection pixels that constitutes a pair is placed in one of pixels corresponding to two adjacent oblique line arrays in order to detect the phase difference and the second phase difference detection pixel that constitutes the pair is placed in the other one of the pixels corresponding to the two adjacent oblique line arrays.

The exemplary embodiments disclose the color imaging element, in which the phase difference detection pixel is placed at a position of the first filter and the placed phase difference detection pixel is placed at a position different, in the vertical direction and the horizontal direction, from that of another phase difference detection pixel placed on a pixel line of one of the horizontal direction and the vertical direction adjacent to the phase difference detection pixel.

The exemplary embodiments disclose the color imaging element, in which in the color filter array, one or more second filters corresponding to each color of the second colors are placed in each line of one of the horizontal and vertical directions of the color filter array.

The exemplary embodiments disclose the color imaging element, in which the first color is green color and the second colors are red color and blue color, an array pattern, in which, among 4 pixels other than the pixels at the center and 4 corners in the 3×3 pixel group, 2 pixels on a same vertical line are set as red color and 2 remaining pixels are set as blue color, is set as a first array, and an array pattern, in which, among 4 pixels, 2 pixels on a same horizontal line are set as red color and 2 remaining pixels are set as blue color, is set as a second array, and the first array and the second array are alternately placed in both the horizontal and vertical directions.

The exemplary embodiments disclose the color imaging element, in which the first color is green color and the second colors are red color and blue color, 4 pixels other than the pixels at the center and the 4 corners in the 3×3 pixel group are divided into two parts each including two obliquely adjacent pixels, and an array pattern, in which 2 pixels in one part are set as red color and 2 pixels in the other part are set as the blue color, is set as the first array and an array pattern, in which 2 pixels in the one part are set as blue color and 2 pixels in the other part are set as red color, is set as the second array, and the first array and the second array are alternately placed in both the horizontal and vertical directions.

The exemplary embodiments disclose the color imaging element, in which a square lattice shaped 6×6 pixel group which includes two first arrays and two second arrays is set as a basic array pattern, and at least one phase difference detection pixel is placed on each pixel line according to in one of the vertical and horizontal directions in the basic array pattern.

The exemplary embodiments disclose the color imaging element, in which a first phase difference detection pixel and a second phase difference detection pixel that constitute a pair are placed on the each pixel line in one of the vertical and horizontal directions in order to detect a phase difference.

The exemplary embodiments disclose the color imaging element, in which a square lattice shaped 6×6 pixel group which includes two first arrays and two second arrays is set as a basic array pattern, and a first phase difference detection pixel of the first and second phase difference detection pixels that constitute a pair is placed in each pixel line in the vertical direction in the basic array pattern and the second phase difference detection pixel is placed on each pixel line in the vertical direction in another basic array pattern vertically adjacent to the one basic array pattern in order to detect a phase difference.

The exemplary embodiments disclose the color imaging element, in which the second phase difference detection pixel is placed in another basic array pattern which is horizontally adjacent to the basic array pattern in which the first phase difference detection pixel is placed.

The exemplary embodiments disclose the color imaging element, in which a square lattice shaped 6×6 pixel group which includes two first arrays and two second arrays is set as a basic array pattern, two basic array patterns adjacent to each other in one of the vertical and horizontal directions are formed as one set, the phase difference detection pixels are placed at pixel positions where the green first filters are densely arrayed in one of the vertical and horizontal directions and pixels other than the phase difference detection pixels are placed at pixel positions where the green first filters are sparsely placed in one of the vertical and horizontal directions, and the first phase difference detection pixel and the second phase difference detection pixel that constitute the pair are placed over the one set of two adjacent basic array patterns.

The exemplary embodiments disclose an imaging apparatus equipped with the color imaging element.

The exemplary embodiments disclose the imaging apparatus, comprising: a thinning reading unit which generates a moving image by thinning and reading a captured image signal from a pixel on a line where the phase difference detection pixel is not present, among vertical pixel lines and horizontal pixel lines.

The exemplary embodiments disclose the imaging apparatus, further comprising: an AF processing unit which performs AF processing by using a detection signal of the phase difference detection pixel.

According to the exemplary embodiments, both the high-resolution phase difference information and the high pixel interpolation precision of a captured image signal of a phase difference detection pixel position may be obtained.

The color imaging element according to the present invention may obtain both the high-resolution phase difference information and the high pixel interpolation precision of the captured image signal of the phase difference detection pixel position, and may be usefully applied to a digital still camera, a digital video camera, etc.

This application claims priority to and the benefit of Japanese Patent Application No. 2011-288032 filed in the Japan Patent Office on Dec. 28, 2011, the entire contents of which are incorporated herein by reference.

What is claimed is:

1. A color imaging element in which color filters of a predetermined color filter array are placed on a plurality of pixels constituted by photoelectric conversion elements arrayed in horizontal and vertical directions, wherein the color filter array includes an array pattern of a 3×3 pixel group in which first filters corresponding to a first color that contributes most to acquiring a luminance signal and second filters corresponding to two or more second colors other than the first color are arrayed, and the first filters are placed at a center and 4 corners in the 3×3 pixel group, and the array pattern is repeatedly placed in the horizontal and vertical directions without intervening other pixels, the first filter is placed in a line of each of horizontal, vertical and oblique directions of the color filter array, a proportion of a number of pixels of the first color corresponding to the first filters is larger than a proportion of a number of pixels of each color of the second colors corresponding to the second filters, and in a pixel group within a predetermined area of the color imaging element, phase difference detection pixels for acquiring phase difference information are placed to cover every component of at least one of the horizontal direction and the vertical direction in the pixel group and normal pixels different from the phase difference detection pixels are placed in the pixel group, wherein the first color is green color and the second colors are red color and blue color, an array pattern, in which, among 4 pixels other than the pixels at the center and 4 corners in the 3×3 pixel group, 2 pixels on a same vertical line are set as red color and 2 remaining pixels are set as blue color, is set as a first array, and an array pattern, in which, among 4 pixels, 2 pixels on a same horizontal line are set as red color and 2 remaining pixels are set as blue color, is set as a second array, and the first array and the second array are alternately placed in both the horizontal and vertical directions.

2. The color imaging element of claim 1, wherein a square lattice shaped 6×6 pixel group which includes two first arrays and two second arrays is set as a basic array pattern, and at least one phase difference detection pixel is placed on each pixel line according to in one of the vertical and horizontal directions in the basic array pattern.

3. The color imaging element of claim 2, wherein a first phase difference detection pixel and a second phase difference detection pixel that constitute a pair are placed on the each pixel line in one of the vertical and horizontal directions in order to detect a phase difference.

4. The color imaging element of claim 1, wherein a square lattice shaped 6×6 pixel group which includes two first arrays and two second arrays is set as a basic array pattern, and a first phase difference detection pixel of the first and second phase difference detection pixels that constitute a pair is placed in each pixel line in the vertical direction in the basic array pattern and the second phase difference detection pixel is placed on each pixel line in the vertical direction in another basic array pattern vertically adjacent to the one basic array pattern in order to detect a phase difference.

5. The color imaging element of claim 4, wherein the second phase difference detection pixel is placed in another basic array pattern which is horizontally adjacent to the basic array pattern in which the first phase difference detection pixel is placed.

6. The color imaging element of claim 1, wherein a square lattice shaped 6×6 pixel group which includes two first arrays and two second arrays is set as a basic array pattern, two basic array patterns adjacent to each other in one of the vertical and horizontal directions are formed as one set, the phase difference detection pixels are placed at pixel positions where the green first filters are densely arrayed in one of the vertical and horizontal directions and pixels other than the phase difference detection pixels are placed at pixel positions where the green first filters are sparsely placed in one of the vertical and horizontal directions, and the first phase difference detection pixel and the second phase difference detection pixel that constitute a pair are placed over the one set of two adjacent basic array patterns in order to detect a phase difference.

7. A color imaging element in which color filters of a predetermined color filter array are placed on a plurality of pixels constituted by photoelectric conversion elements arrayed in horizontal and vertical directions, wherein the color filter array includes an array pattern of a 3×3 pixel group in which first filters corresponding to a first color that contributes most to acquiring a luminance signal and second filters corresponding to two or more second colors other than the first color are arrayed, and the first filters are placed at a center and 4 corners in the 3×3 pixel group, and the array pattern is repeatedly placed in the horizontal and vertical directions without intervening other pixels, the first filter is placed in a line of each of horizontal, vertical and oblique directions of the color filter array, a proportion of a number of pixels of the first color corresponding to the first filters is larger than a proportion of a number of pixels of each color of the second colors corresponding to the second filters, and in a pixel group within a predetermined area of the color imaging element, phase difference detection pixels for acquiring phase difference information are placed to cover every component of at least one of the horizontal direction and the vertical direction in the pixel group and normal pixels different from the phase difference detection pixels are placed in the pixel group, wherein the first color is green color and the second colors are red color and blue color, 4 pixels other than the pixels at the center and the 4 corners in the 3×3 pixel group are divided into two parts each including two obliquely adjacent pixels, and an array pattern, in which 2 pixels in one part are set as red color and 2 pixels in the other part are set as the blue color, is set as the first array and an array pattern, in which 2 pixels in the one part are set as blue color and 2 pixels in the other part are set as red color, is set as the second array, and the first array and the second array are alternately placed in both the horizontal and vertical directions.

* * * * *